(12) United States Patent
Wang et al.

(10) Patent No.: US 12,291,585 B2
(45) Date of Patent: May 6, 2025

(54) MOLDED PRODUCT COMPRISING POLARIZED OLEFIN-BASED POLYMER AND PROPERTY THEREOF

(71) Applicant: RIKEN, Wako (JP)

(72) Inventors: Haobing Wang, Wako (JP); Yang Yang, Wako (JP); Masayoshi Nishiura, Wako (JP); Zhaomin Hou, Wako (JP)

(73) Assignee: RIKEN, Wako (JP)

( * ) Notice: Subject to any disclaimer, the term of this patent is extended or adjusted under 35 U.S.C. 154(b) by 161 days.

(21) Appl. No.: 17/989,280

(22) Filed: Nov. 17, 2022

(65) Prior Publication Data
US 2023/0110760 A1    Apr. 13, 2023

Related U.S. Application Data

(63) Continuation of application No. 16/979,984, filed as application No. PCT/JP2019/010592 on Mar. 14, 2019, now Pat. No. 11,535,688.

(30) Foreign Application Priority Data

Mar. 14, 2018  (JP) ................................ 2018-046829

(51) Int. Cl.
  *C08F 210/02*  (2006.01)
  *C08F 212/14*  (2006.01)
  (Continued)

(52) U.S. Cl.
  CPC .............. *C08F 210/02* (2013.01); *C08J 5/18* (2013.01); *C09D 123/0846* (2013.01);
  (Continued)

(58) Field of Classification Search
  None
  See application file for complete search history.

(56) References Cited

U.S. PATENT DOCUMENTS 5,792,729 A * 8/1998 Harrison ............... C08F 210/14
                                                       525/379
5,939,506 A * 8/1999 Plochocka ............ C08F 222/06
                                                       526/272
(Continued)

FOREIGN PATENT DOCUMENTS

CN        101560274 A     10/2009
CN        107141391 A      9/2017
(Continued)

OTHER PUBLICATIONS

"Main, adj.". Oxford English Dictionary. Jun. 2024. Oxford UP. https://www.oed.com/dictionary/main_adj2 (accessed Aug. 22, 2024) . (Year: 2024).*

(Continued)

*Primary Examiner* — Richard A. Huhn
(74) *Attorney, Agent, or Firm* — Foley & Lardner LLP

(57) ABSTRACT

The object of the invention is to provide a novel olefin-based molded product useful for various applications.

An olefin-based molded product comprising a polymer including a structural unit of at least one polar olefin monomer represented by the general formula (I) $CH_2=CH-R^2-Z(R^1)_n$ is provided. In the formula, Z is a hetero atom selected from the group consisting of nitrogen, oxygen, phosphorus, sulfur, and selenium; $R^1$ is a substituted or unsubstituted hydrocarbyl group having 1 to 30 carbon atoms; n is an integer of 1 or 2 depending on the atomic species of Z; and $R^2$ is a substituted or unsubstituted hydrocarbylene group having 2 to 20 carbon atoms.

8 Claims, 40 Drawing Sheets

(51) Int. Cl.
*C08J 5/18* (2006.01)
*C09D 123/08* (2006.01)
(52) U.S. Cl.
CPC .......... *C08F 212/14* (2013.01); *C08F 212/22* (2020.02); *C08F 212/28* (2020.02); *C08F 212/30* (2020.02); *C08F 2500/27* (2021.01); *C08F 2800/10* (2013.01); *C08J 2323/08* (2013.01)

(56) References Cited

U.S. PATENT DOCUMENTS

| | | | |
|---|---|---|---|
| 2007/0232758 | A1 | 10/2007 | Hou et al. |
| 2020/0010581 | A1 | 1/2020 | Wang et al. |

FOREIGN PATENT DOCUMENTS

| | | | |
|---|---|---|---|
| DE | 15 70 541 | A | 1/1970 |
| JP | 2010-241930 | A | 10/2010 |
| JP | 4675259 | B2 | 4/2011 |
| JP | 2011-231291 | A | 11/2011 |
| JP | 2011-231292 | A | 11/2011 |
| WO | WO-2006/004068 | A1 | 1/2006 |
| WO | WO-2018/168940 | A1 | 9/2018 |

OTHER PUBLICATIONS

Blaiszik et al: "Self-Healing Polymers and Composites"; Annu. Rev. Mater. Res.; Apr. 5, 2010; pp. 40:179-211.

Byun, Doo-Jin et al., "Synthesis of Phenol Group Containing Polyethylenes via Metallocene Catalyzed Ethylene-Allylanisole Copolymerization", Macromolecular Chemistry and Physics, 2001, 2020, pp. 992-997.

Chen, Jiazhen et al., "Scandium-Catalyzed Self-Assisted Polar Co-monomer Enchainment in Ethylene Polymerization", Angew. Chem. Int. Ed., 2017, 56, pp. 15964-15968.

International Search Report dated Jun. 18, 2019 for corresponding International Patent Application No. PCT/JP2019/010592.

Kim et al: "Superior Toughness and Fast Self-Healing at Room Temperature Engineered by Transparent Elastomers"; Advanced Materials-Self Healing Materials; 30, 1705145, 2018; Nov. 13, 2017; pp. 1-8.

Wang, Haobing et al., "Synthesis of Self-Healing Polyers by Scandium-Catalyzed Copolymerization of Ethylene and Anisylpropylenes", J. Am. Chem. Soc., Feb. 6, 2019, 141, pp. 3249-3257.

Written Opinion dated Jun. 18, 2019 for corresponding International Patent Application No. PCT/JP2019/010592.

Yanagisawa et al.; "Mechanically robust, readily repairable polymers via tailored noncovalent cross-linking"; Science 359; Jan. 5, 2018; pp. 72-76.

Partial Supplementary European Search Report dated Nov. 4, 2021 for corresponding European Patent Application No. 19766728.0, (12 pages).

Wang et al., Synthesis of Self-Healing Polymers by Scandium-Catalyzed Copolymerization of Ethylene and Anisylpropylenes Journal of the American Chemical Society 2019, 141(7), 3249-3257. (Year: 2019).

\* cited by examiner $^1$H NMR (C$_2$D$_2$Cl$_4$, 500 MHz, 26.8 °C)

$n^{AP} = 1$ $n^{Ethylene} = H^{5\&6}/4 = (8.2-2)/4 = 1.55$

AP mol% = $n^{AP}/(n^{AP}+n^{Ethylene})$ = 1/(1 + 1.55) = 39 mol%

A

B

— AP-*alt*-E segment
○ crystalline nanodomain of E-E segments

MOLDED PRODUCT COMPRISING POLARIZED OLEFIN-BASED POLYMER AND PROPERTY THEREOF

CROSS-REFERENCE TO RELATED APPLICATIONS

The present application is a Continuation of U.S. patent application Ser. No. 16/979,984, filed on Sep. 11, 2020, which claims priority under 37 U.S.C. § 371 to International Patent Application No. PCT/JP2019/010592, filed Mar. 14, 2019, which claims priority to and the benefit of Japanese Patent Application No. 2018-046829, filed on Mar. 14, 2018. The contents of these applications are hereby incorporated by reference in their entireties.

TECHNICAL FIELD

The present invention relates to an olefin-based molded product comprising a polar olefin-based polymer. More particularly, the present invention relates to an olefin-based molded product, which comprises a polar olefin-based polymer having properties such as a self-healing ability, and is useful for various applications.

BACKGROUND ART

Conventionally, olefin-based molded products such as a polyolefin film have been used in various ways as packaging materials, etc., however utilization as a high-performance molded article imparted with a special function (such as self-healing ability, and shape-memory property) has been limited to some applications.

By developing a high-performance self-healing material, not only waste is reduced and sustainability is acquired, but also products superior in safety and reliability can be created (Non Patent Literature 1). A self-healing material is particularly attractive in applications where a damage is hardly detected, or in applications where repair is costly or impossible (such as a medical implant in a human body, a submarine pipeline, and a device in outer space). Wool has constructed a unified theory based on the De Gennes' reptation dynamics and the entanglement percolation model. Following this unified theory, by jointing two fractures of an amorphous polymer through five steps (surface rearrangement, approach of the polymer chains, wetting, diffusion, and chain randomization), re-repair can be achieved at a temperature higher than the glass transition temperature (Tg) of the amorphous polymer. However, due to the slow rate of the last two steps, in the case of a high molecular weight polymer, the healing time for jointing the fractures becomes long. Therefore, in most cases, an efficient diffusion-dependent repair occurs at a high temperature (120° C. or higher) (Non Patent Literature 1). Several carefully designed materials with an extrinsic self-healing ability based on a covalent bond have been reported. However, most of these strategies require an input of a catalyst/monomer, or external energy. Several clear dynamic supramolecular approaches (metal-ligand interaction, multivalent hydrogen bonds, etc.) toward a material with an intrinsic autonomous self-healing have been established (Non Patent Literature 2). However, to date, improvement has been limited to a soft elastomer, and the improvement realized so far includes an elaborately designed complex macromolecule structure.

Most recently, Aida, et al. reported an amorphous polymer including a series of hydrogen bonds that exhibited facile repairability, and robust mechanical properties under a specific pressure (Non Patent Literature 3). As described above, it has been a difficult task to develop a material having both an autonomous self-healing function and strong mechanical properties.

PRIOR ART DOCUMENTS

Non Patent Literature

[Non Patent Literature 1] B. J. Blaiszik, S. L. B. Kramer, S. C. Olugebefola, J. S. Moore, N. R. Sottos, and S. R. White, "Self-healing polymers and composites", Annu. Rev. Mater. Res., 40, 179-211 (2010).

[Non Patent Literature 2] S. Kim, "Superior Toughness and Fast Self-Healing at Room Temperature Engineered by Transparent Elastomers", Adv. Mater. 30, 1705145 (2018).

[Non Patent Literature 3] Y. Yanagisawa, Y. Nan, K. Okuro, and T. Aida, "Mechanically Robust, Readily Repairable Polymers via Tailored Noncovalent Cross-Linking", Science 359, 72-76 (2018) DOI: 10.1126/science.aam7588.

SUMMARY OF THE INVENTION

Technical Problem

The present invention has been made under such circumstances with an object to provide a novel olefin-based molded product useful for various applications.

Solution to Problem

The present inventors have deliberately conducted studies to attain the above object. The present inventors have found that a polar olefin-based polymer obtained by polymerizing a polar olefin monomer using a rare-earth metal complex can be utilized as a raw material for a molded product such as a film, and that a molded product such as a film produced by using the polymer has various functionalities such as an autonomous self-healing ability, or a shape-memory property. The present invention has been completed based on these findings.

That is, the essentials of the present invention are as follows.

[1] An olefin-based molded product comprising a polymer including a structural unit of at least one polar olefin monomer represented by the general formula (I):

$$CH_2=CH-R^2-Z(R^1)_n \qquad (I)$$

wherein, Z is a hetero atom selected from the group consisting of nitrogen, oxygen, phosphorus, sulfur, and selenium; $R^1$ is a substituted or unsubstituted hydrocarbyl group having 1 to 30 carbon atoms; n is an integer of 1 or 2 depending on the atomic species of Z; and $R^2$ is a substituted or unsubstituted hydrocarbylene group having 2 to 20 carbon atoms.

[2] The olefin-based molded product according to [1] above, wherein the polymer is a copolymer including an additional structural unit of at least one nonpolar olefin monomer.

[3] The olefin-based molded product according to [2] above, wherein the copolymer includes an alternating sequence of the structural unit of at least one polar olefin monomer represented by the general formula (I) and the structural unit of at least one nonpolar olefin monomer, and a polymerization sequence of the structural unit of at least one nonpolar olefin monomer.

An embodiment of the olefin-based molded product of [3] above comprising said copolymer shows an X-ray diffraction peak derived from crystalline nanodomains formed by aggregation of the polymerization sequences.

[4] The olefin-based molded product according to any one of [1] to [3] above, wherein the polar olefin monomer is a polar olefin monomer represented by the general formula (II).

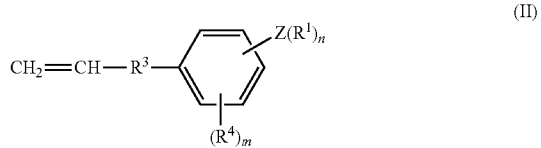

In the formula, Z is a hetero atom selected from the group consisting of nitrogen, oxygen, phosphorus, sulfur, and selenium; R' is a substituted or unsubstituted hydrocarbyl group having 1 to 30 carbon atoms; n is an integer of 1 or 2 depending on the atomic species of Z; $R^3$ is a hydrocarbylene group having 1 to 5 carbon atoms; $R^4$ is a halogen atom, a hydrocarbyl group having 1 to 10 carbon atoms, an alkylthio group having 1 to 10 carbon atoms, an alkylamino group having 1 to 10 carbon atoms, or an alkoxy group having 1 to 10 carbon atoms, and when $R^4$ is a hydrocarbyl group, the hydrocarbyl groups may bond together to form a condensed ring; and m is an integer of 0 to 4.

[5] The olefin-based molded product according to any one of [1] to [4] above, wherein the proportion of the structural unit of polar olefin monomer in the total structural units in the polymer is 20 mol % or more.

[6] The olefin-based molded product according to any one of [1] to [5] above, wherein the number average molecular weight of the polymer is $2.0 \times 10^3$ or more.

[7] The olefin-based molded product according to any one of [2] to [6] above, wherein the polymer is a copolymer including at least structural units respectively represented by the following formulas (III) and (IV).

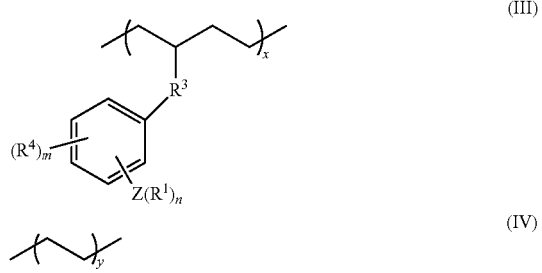

In the formula, $R^1$, $R^3$, $R^4$, Z, m and n respectively have the same meanings as in the formula (II), and each of x and y stands for the proportion (molar ratio) of a structural unit in the total sequences of the copolymer, and is a positive number that satisfies x>0, y>0, x>y, and 80%≤x+y≤100%).

[8] An olefin-based molded product comprising a polymer including a structural unit of a polar olefin monomer, and having a toughness value of 0.5 MJm$^{-3}$ or more.

In this regard, examples of a polar group contained in the polar olefin monomer include —Z(R$^1$)$_n$, in the formula (I). The same applies to [9] and [10] below. Examples of a polymer used in a molded product of this embodiment include the (co)polymer according to [1] to [7] above. Among others, the copolymer according to [7] above is preferable. The molded product preferably exhibits a toughness value in the above range at the service temperature of the molded product (for example, 25° C., when it is room temperature). Further, the molded product preferably has a tensile strength of 0.5 MPa or more, and/or an elongation at break of more than 100%.

[9] An olefin-based molded product comprising a polymer including a structural unit of a polar olefin monomer, and having a tensile strength of 0.5 MPa or more.

Examples of a polymer used in a molded product of this embodiment include the (co)polymers according to [1] to [7] above. Among others, the copolymer according to [7] is preferable. The molded product preferably exhibits a tensile strength in the above range at the service temperature of the molded product (for example, 25° C., when it is room temperature). Further, the molded product preferably has a tensile strength in the above range, and also an elongation at break of more than 100%, and/or a toughness value of 0.5 MJm$^{-3}$ or more.

[10] An olefin-based molded product comprising a polymer including a structural unit of a polar olefin monomer, and having an elongation at break of more than 100%.

Examples of a polymer used in a molded product of this embodiment include the (co)polymers according to [1] to [7] above. Among others, the copolymer according to [7] is preferable. The molded product preferably exhibits an elongation at break in the above range at the service temperature of the molded product (for example, 25° C., when it is room temperature). Further, the molded product preferably has an elongation at break in the above range, and also a toughness value of 0.5 MJm$^{-3}$ or more, and/or a tensile strength of 0.5 MPa or more.

[11] The olefin-based molded product according to any one of [1] to [10] above, which is a film.

[12] The olefin-based molded product according to any one of [1] to [11] above, which is used as a self-healing material. One embodiment of the present invention is a self-healing material which is constituted with the olefin-based molded product according to any one of [1] to [11] above, or which includes the olefin-based molded product. Another embodiment thereof is a self-healing molded product which is constituted with the olefin-based molded product according to any one of [1] to [11] above, or which includes the olefin-based molded product.

One embodiment of the self-healing molded product comprises the polymer exhibiting a glass transition point below room temperature (25° C.).

One embodiment of the self-healing molded product exhibits a self-healing rate of 80% or more within 5 days.

[13] The olefin-based molded product according to any one of [1] to [11] above, which is used as a shape-memory material. One embodiment of the present invention is a shape-memory material which is constituted with the olefin-based molded product according to any one of [1] to [11] above, or which includes the olefin-based molded product. Another embodiment thereof is a shape-memory molded product which is constituted with the olefin-based molded product according to any one of [1] to [11] above, or which includes the olefin-based molded product.

One embodiment of the shape-memory molded product comprises the polymer exhibiting a glass transition point of about room temperature (e.g., 15° C. to 35° C.), or above room temperature. For example, the shape-memory molded product has a nature that it maintains a constant shape S1 at a temperature Tu at which it is used (for example, room temperature), it is deformed at a temperature Td which exceeds Tg (Tu<Tg) (and is below the melting point if there is a melting point), and then cooled down to the service temperature Tu so as to maintain the shape S2, and further it can be returned to the original shape S1 at a temperature Tf which is beyond Tg (and is below the melting point if there is a melting point) (Tf may be the same as or different from Td).

One embodiment of the shape-memory molded product exhibits a shape fixed rate and a shape recovery rate of 80% or more.

[14] The polymer according to any one of [1] to [7] above.

[15] A coating composition comprising at least one of the polymers according to any one of [1] to [7] above.

The composition may include a liquid or solid medium together with the polymer. The polymer may be dissolved or not dissolved (for example, dispersed) in the medium.

Advantageous Effects of the Invention

According to the present invention, a novel olefin-based molded product useful for various applications may be provided.

DESCRIPTION OF THE EMBODIMENTS

Figure 1:
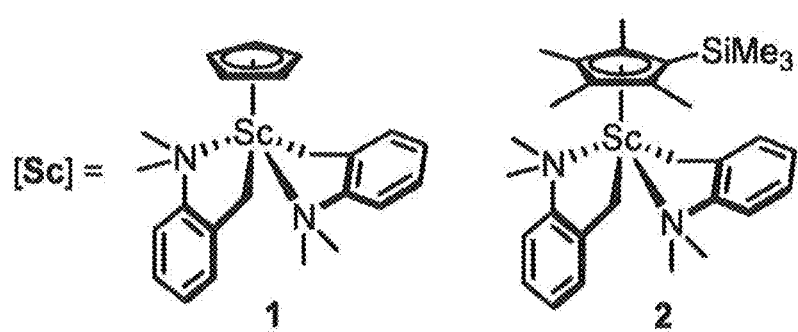
FIG. 1 is a diagram showing the structures of metallocene complexes used in Examples.

The present invention will be described in detail below.

The present inventors have found a new kind of olefin-based material that can be obtained by one-step polymerization of a polar olefin monomer represented by a predetermined formula (such as anisylpropylene or its derivative) using a scandium complex. This novel material is useful as a raw material for a molded product (such as a film). In particular, in the case of a copolymer with a nonpolar olefin monomer (such as ethylene), it has mainly an alternating sequence of a nonpolar olefin monomer (such as ethylene)—a polar olefinic monomer (such as anisylpropylene or its derivative), the material can exhibit a wide range of glass transition temperature, and a variety of mechanical properties (rigid plastic, flexible plastic, elastomer, or stress softening material) by regulating one or more of the polymerization ratio of each monomer, molecular weight, monomer type, etc. An embodiment of the material is an elastomer and a self-healing material. Specifically, among the above materials, an elastomer exhibits excellent elasticity, and elastic recovery, and in the case of an autonomous self-healing elastomer, high tensile strength and toughness. An autonomous self-healing elastomer is capable of self-healing not only in air but also in water, and an acid or alkaline solution without the need for external energy or stimulation. Even more surprisingly, the healed material exhibits excellent tensile strength and elongation, and exhibits higher values compared to any heretofore reported self-healing material after self-healing, or self-healing material before self-healing.

Another embodiment of the material is rigid plastic, which showed remarkable shape-memory property.

The present invention relates to an olefin-based molded product comprising a polymer including a structural unit of at least one polar olefin monomer represented by the general formula (I):

$$CH_2=CH-R^2-Z(R^1)- \qquad (I)$$

In the formula, Z is a hetero atom selected from the group consisting of nitrogen, oxygen, phosphorus, sulfur, and selenium; $R^1$ is a substituted or unsubstituted hydrocarbyl group having 1 to 30 carbon atoms; n is an integer of 1 or 2 depending on the atomic species of Z; and $R^2$ is a substituted or unsubstituted hydrocarbylene group having 2 to 20 carbon atoms.

<Method for Producing Polar Olefin-Based Polymer>

A method for producing a polymer including a structural unit of at least one polar olefin monomer represented by the general formula (I), namely a polymer of at least one polar olefin monomer represented by the general formula (I) (hereinafter also referred to as "polar olefin-based polymer") to be contained in an olefin-based molded product of the present invention will be described below. A mere expression of "polymer" is meant herein to include a homopolymer and a copolymer unless otherwise specified.

(Catalyst Composition)

The polar olefin-based polymer may be obtained, for example, by polymerizing at least one kind of polar olefin monomer represented by the general formula (I) using a catalyst composition containing a metallocene complex and an ionic compound. It may be copolymerized with a monomer other than the polar olefin monomer represented by the general formula (I), and particularly a polar olefin-based polymer copolymerized with at least one nonpolar olefin monomer is preferable.

(Metallocene Complex)

There is no particular limitation on the metallocene complex, and examples thereof include the scandium complex $(C_5Me_4SiMe_3)Sc(CH_2C_6H_4NMe_2\text{-}o)_2$ described in Examples.

A metallocene complex can be synthesized by the method described above, for example, the method according to (1) X. Li, M. Nishiura, K. Mori, T. Mashiko, and Z. Hou, Chem. Commun. 4137-4139 (2007), (2) M. Nishiura, J. Baldamus, T. Shima, K. Mori, and Z. Hou, Chem. Eur. J., 17, 5033-5044 (2011), (3) F. Guo, M. Nishiura, H. Koshino, and Z. Hou, Macromolecules, 44, 6335-6344 (2011), (4) Reference: Tardif O., Nishiura M., and Hou Z. M., Organometallics, 22, 1171, (2003), (5) Reference: Hultzsch K. C., Spaniol T. P., and Okuda J., Angew. Chem. Int. Ed, 38, 227, (1999), (6) Reference: International Publication No. WO2006/004068, (7) Reference: Japanese Patent Laid-Open No. 2008-222780, or (8) Reference: Japanese Patent Laid-Open No. 2008-095008.

(Ionic Compound)

When the ionic compound is combined with the metallocene complex, the metallocene complex develops an activity as a polymerization catalyst. As the mechanism, it is considered that an ionic compound reacts with a metallocene complex to form a cationic complex (active species).

There is no particular limitation on the ionic compound to be contained in the catalyst composition, and examples thereof include a combination of those selected respectively from non-coordinating anions and cations.

Preferable examples thereof include triphenylcarbonium tetrakis(pentafluorophenyl)borate, triphenylcarbonium tetrakis(tetrafluorophenyl)borate, N,N-dimethylanilinium tetrakis(pentafluorophenyl)borate, and 1,1'-dimethylferrocenium tetrakis(pentafluorophenyl)borate. The ionic compounds may be used singly or in combination of two or more kinds thereof.

Among these ionic compounds, particularly preferable examples include triphenylcarbonium tetrakis(pentafluorophenyl)borate.

In the catalyst composition, the molar ratio of an ionic compound with respect to a metallocene complex varies depending on the kinds of the complex and the ionic compound, and may be set appropriately.

For example, when the ionic compound is composed of a carbonium cation and a boron anion (e.g., $[Ph_3C][B(C_6F_5)_4]$), the molar ratio is preferably from 0.5 to 1 with respect to the central metal of a metallocene complex. When it is an alkylaluminum compound such as methylaluminoxane, the molar ratio is preferably about 10 to 4000 with respect to the central metal of a metallocene complex.

It is believable that the ionic compound ionizes a metallocene complex, namely cationizes it to a catalytically active species. When the ratio is within the above range, the metallocene complex can be sufficiently activated, while the ionic compound composed of a carbonium cation and a boron anion does not become excessive, so that the risk of causing an undesired reaction with a monomer to be polymerized can be reduced.

(Method for Producing Polymer)

Using the catalyst composition as a polymerization catalyst composition, an olefin-based polymer can be produced by polymerizing (addition polymerization) a polar olefin monomer, and preferably by polymerizing (addition polymerization) a nonpolar olefin monomer and a polar olefin monomer.

When 1) a composition containing each constituent (such as metallocene complex, or ionic compound) is supplied into a polymerization reaction system, or 2) each constituent is supplied separately into a polymerization reaction system to form a composition in the reaction system, which may be used as a polymerization catalyst composition.

In 1) above, the expression "a composition is supplied" includes that a metallocene complex (active species) activated by a reaction with an ionic compound is supplied.

Specifically, the method for producing a polymer may be performed, for example, by the following procedure.

1. A polymerizable monomer is supplied into a system (preferably a liquid phase) containing a catalyst composition to be used in the method for producing a polymer, and polymerized. By doing so, when the monomer is a liquid, it may be supplied by dropping, and when it is a gas, it may be supplied through a gas tube (such as bubbling in the case of a liquid phase reaction system).
2. A catalyst composition to be used in the method for producing a polymer is added to a system (preferably in a liquid phase) comprising a polymerizable monomer, or constituents of a catalyst composition are added individually to cause polymerization. The added catalyst composition may be prepared in advance (preferably prepared in the liquid phase), and then activated (in this case, it is preferable to add the same without exposure to air).

Further, the production method may be any method, such as a gas phase polymerization method, a solution polymerization method, a suspension polymerization method, a liquid phase bulk polymerization method, an emulsion polymerization method, and a solid phase polymerization method. In the case of a solution polymerization method, there is no particular limitation on the solvent used, insofar as it is a solvent which is inert in the polymerization reaction, able to dissolve the monomer and the catalyst, and does not interact with the catalyst. Examples thereof include a saturated aliphatic hydrocarbon, such as butane, pentane, hexane, and heptane; a saturated alicyclic hydrocarbon, such as cyclopentane, and cyclohexane; an aromatic hydrocarbon, such as benzene and toluene; and a halogenated hydrocarbon, such as methylene chloride, chlorobenzene, bromobenzene, and chlorotoluene.

Also, a solvent that is not toxic to living body is preferable. Specifically, an aromatic hydrocarbon, especially toluene, is preferred. The solvents may be used singly, or a mixed solvent combining two or more kinds thereof may be used.

The amount of the solvent used is arbitrary, but for example, the amount corresponding to the concentration of a complex contained in the polymerization catalyst of $1.0 \times 10^{-5}$ to $1.0 \times 10^{-1}$ mol/L is preferable.

The amount of the monomer to be supplied to the polymerization reaction may be appropriately set according to the desired polymer to be produced, and, for example, the monomer is preferably 100 times or more, 200 times or more, or 500 times or more as much as the metallocene complex constituting the polymerization catalyst composition in terms of molar ratio.

When the polymerization is carried out by solution polymerization, any polymerization temperature, for example, in a range of −90 to 100° C. may be used. It may be appropriately selected depending on the kind of monomer to be polymerized, but usually it may be around room temperature, namely about 25° C.

The polymerization time is about several sec to several days, and it may be appropriately selected depending on the kind of monomer to be polymerized. It may be 1 hour or less, and in some cases even 1 min or less.

However, these reaction conditions may be appropriately selected depending on the polymerization reaction temperature, the type and molar amount of the monomer, the kind and amount of the catalyst composition, or the like, and not limited to the range indicated above.

In an embodiment in which the polymer is produced as a copolymer,
1) a random copolymer or an alternating copolymer can be produced by polymerizing a mixture of two or more kinds of monomers in the presence of a catalyst composition, or
2) a block copolymer can be produced by sequentially supplying each monomer into the reaction system containing a catalyst composition.

After the polymerization step, it is possible to perform an optional step, such as a purification step, or a step of deriving a polar group such as a step of eliminating $R^1$ in a polar group.

(Polar Olefin Monomer)

A polar olefin monomer used in the method for producing a polymer is a polar olefin monomer including a polar group. A polar olefin monomer represented by the following general formula (I) is preferable.

$$CH_2=CH-R^2-Z(R^1)_n \quad (I)$$

In general formula (I), Z is a hetero atom selected from the group consisting of nitrogen, oxygen, phosphorus, sulfur, and selenium; $R^1$ is a substituted or unsubstituted hydrocarbyl group having 1 to 30 carbon atoms; and n is an integer of 1 or 2 depending on the atomic species of Z.

In the method for producing a polymer, it is considered that a hetero atom in a polar olefin monomer interacts with the central metal of a catalyst to form an intramolecular chelate, which promotes the interaction between the catalyst and the olefin unit, promotes the polymerization activity of the polar olefin monomer, and exhibits unique stereoselectivity.

There is no particular limitation on $R^1$ in the general formula (I), insofar as an intramolecular interaction among a hetero atom in the polar group of a polar olefin monomer, the olefin unit, and the central metal of a catalyst is formed in the polymerization reaction. $R^1$ is usually a substituted or unsubstituted hydrocarbyl group having 1 to 30 carbon atoms; and preferably a linear, branched, or cyclic alkyl group, a linear, or branched alkenyl group, or a linear, or branched alkynyl group having 1 to 20 carbon atoms, 1 to 10 carbon atoms, or 1 to 6 carbon atoms; an alkyl group, an alkenyl groups, a cyclic alkyl group substituted with an alkynyl group having 1 to 10 carbon atoms (wherein the number of alkyl groups, alkenyl groups, or alkynyl groups as a substituent, and the substitution position in the cyclic alkyl group are not particularly limited); an aryl group; or an aryl group substituted with an alkyl group, an alkenyl group, or an alkynyl group having 1 to 10 carbon atoms (wherein the number of alkyl groups, alkenyl groups, or alkynyl groups as a substituent, and the substitution position in the aryl group are not particularly limited). In this case, the cyclic alkyl group or the aryl group may form a saturated or unsaturated condensed ring.

The hydrocarbyl group in the substituted hydrocarbyl group is the same as the hydrocarbyl group described above. A substituted hydrocarbyl group means a hydrocarbyl group in which at least one hydrogen atom is substituted with a halogen atom, or the like.

$R^2$ acts as a spacer connecting the polar group and the olefin moiety in the polar olefin monomer. There is no particular limitation on $R^2$, insofar as an intramolecular interaction among a hetero atom in the polar group of a polar olefin monomer, the olefin unit, and the central metal of a catalyst is formed in the polymerization reaction. $R^2$ preferably has 2 to 20 carbon atoms from the viewpoint of forming the intramolecular interaction. As the number of carbon atoms of $R^2$, the number of carbon atoms suitable for forming an intramolecular interaction among a hetero atom, the olefin unit, and the central metal of a catalyst in the polymerization reaction may be selected using the polymerization activity, or the like as the index depending on the kind of a hetero atom represented by Z, the kind of a substituent represented by R', etc. Usually, $R^2$ is a hydrocarbylene group having 2 to 11 carbon atoms. It is more preferably a linear or branched alkylene group having 2 to 3 carbon atoms; a cyclic alkylene group having 3 to 11 carbon atoms; an arylene group having 6 to 11 carbon atoms; or an aralkylene group having 7 to 11 carbon atoms. Examples of the substituent of $R^2$ include a halogen atom, a hydrocarbyl group having 1 to 10 carbon atoms, an alkylthio group having 1 to 10 carbon atoms, an alkylamino group having 1 to 10 carbon atoms, and an alkoxy group having 1 to 10 carbon atoms.

One embodiment of the compound represented by the general formula (I) is a compound represented by the general formula (II).

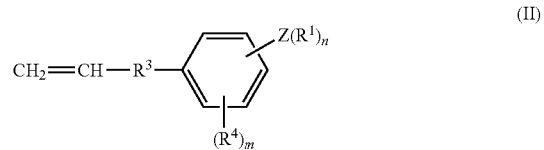

Z, $R^1$, and n in the general formula (II) are synonymous with the definitions described in connection with the general formula (I). Z in the general formula (II) is preferably oxygen. $R^1$ in the general formula (II) is preferably a linear, branched, or cyclic alkyl group having 1 to 3 carbon atoms.

The bonding position of $-Z(R^1)_n$ in the aromatic ring is not particularly limited, but it is preferably the o-position.

Usually, $R^3$ is a hydrocarbylene group having 1 to 5 carbon atoms. More preferably, it is a linear or branched alkylene group having 1 to 3 carbon atoms; or a cyclic alkylene group having 3 to 5 carbon atoms.

$R^4$, which is a substituent of the aromatic ring, is a halogen atom, a hydrocarbyl group having 1 to 10 carbon atoms, an alkylthio group having 1 to 10 carbon atoms, an alkylamino group having 1 to 10 carbon atoms, or an alkoxy group having 1 to 10 carbon atoms. When $R^4$ is a hydrocarbyl group, the groups may bond together to form a saturated, unsaturated, or hetero condensed ring. Although there is no particular limitation on the substitution position of $R^4$ in the aromatic ring, it is preferably the meta-position. m is an integer of 0 to 4, and more preferably 0 to 2.

Examples of a halogen atom include a fluorine atom, a chlorine atom, a bromine atom, and an iodine atom. Examples of a hydrocarbyl group having 1 to 10 carbon atoms include more preferably a linear or branched alkyl group, alkenyl group, or alkynyl group having 1 to 6 carbon atoms, and further preferably a methyl group, an ethyl group, a n-propyl group, an isopropyl group, a n-butyl group, an isobutyl group, a sec-butyl group, a tert-butyl group, a n-pentyl group, and a n-hexyl group. The alkylthio group having 1 to 10 carbon atoms is more preferably an alkylthio group having 1 to 6 carbon atoms, and examples thereof include a methylthio group, an ethylthio group, an n-propylthio group, an isopropylthio group, a n-butylthio group, an isobutylthio group, a sec-butylthio group, a tert-butylthio group, a n-pentylthio group, and a n-hexylthio group. The alkylamino group having 1 to 10 carbon atoms is more preferably an alkylamino group having 1 to 6 carbon atoms. The alkylamino group is preferably a dialkylamino group, and the alkyls substituting amino groups may be the same or different alkyls. More preferable examples of the alkylamino group include a dialkylamino group, such as a dimethylamino group, a diethylamino group, a di-n-propylamino group, a diisopropylamino group, a di-n-butylamino group, a diisobutylamino group, a di-sec-butylamino group, and a di-tert-butylamino group. The alkoxy group having 1 to 10 carbon atoms is more preferably an alkoxy group having 1 to 3 carbon atoms, and examples thereof include a methoxy group, an ethoxy group, and a propoxy group. Examples of a saturated condensed ring formed by mutual binding of $R^4$s and condensation with the aromatic ring substituted with the $R^4$ include a naphthalene ring. Examples of the hetero-condensed ring formed by mutual binding of $R^4$s and condensation with the aromatic ring substituted with the $R^4$ include an indole ring, an isoindole ring, a quinoline ring, an isoquinoline ring, a carbazole ring, an acridine ring, a benzofuran ring, a benzopyran ring, and a benzothiophene ring. The condensed ring may have 1 to 6 substituents, and the substituents are the same as $R^4$ above.

Specific examples of the compound represented by the general formula (II) include, but not limited to, a substituted 2-allylanisole (hereinafter also referred to as "$AP^R$"), such as 2-allyl-4-fluoroanisole, 2-allyl-4,5-difluoroanisole, 2-allyl-4-methylanisole, 2-allyl-4-tert-butylanisole, 2-allyl-4-hexylanisole, 2-allyl-4-methoxyanisole, and 3-(2-methoxy-1-naphthyl)-1-propyl ene; and unsubstituted 2-allylanisole (3-(2-anisyl)-1-propylene) (hereinafter also referred to as "AP").

The polar olefin monomers may be used singly in a polymerization reaction, or in combination of two or more kinds thereof (Nonpolar Olefin Monomer)

The polar olefin monomer may be copolymerized with another monomer (preferably nonpolar olefin monomer). There is no particular limitation on a nonpolar olefin monomer, insofar as it is capable of addition-polymerization, and copolymerization with a polar olefin monomer. Examples thereof include ethylene, α-olefin, a substituted and unsubstituted styrene, a diene, and a cyclic olefin having 3 to 20 carbon atoms (including a norbornene, such as 2-norbornene and dicyclopentadiene, and cyclohexadiene).

Specific examples of the α-olefin include a linear α-olefin having 3 to 20 carbon atoms, such as propylene, 1-butene, 1-pentene, 1-hexene, 1-octene, 1-decene, 1-dodecene, 1-tetradecene, 1-hexadecene, 1-octadecene, and 1-eicocene; and a branched α-olefin having 4 to 20 carbon atoms, such as 4-methyl-1-pentene, 3-methyl-1-pentene, and 3-methyl-1-butene. Examples of the diene, which is an olefinic monomer, include a linear diene having 3 to 20 carbon atoms, such as 1,3-butadiene, 1,3-pentadiene, 1,4-pentadiene, 1,3-hexadiene, 1,4-hexadiene, 1,5-hexadiene and 2,4-hexadiene; a branched diene having 4 to 20 carbon atoms, such as 2-methyl-1,3-butadiene, 2,4-dimethyl-1,3-pentadiene, and 2-methyl-1,3-hexadiene; and a cyclic diene having 4 to 20 carbon atoms, such as cyclohexadiene.

The nonpolar olefin monomers singly may be used singly in a polymerization reaction, or in combination of two or more kinds thereof.

The polar olefin monomer, or nonpolar olefin monomer may be synthesized and used based on a method common in the field of organic chemistry. Alternatively, a commercially available one may be used.

<Polar Olefin-Based Polymer>

An olefin-based molded product of the present invention contains a polar olefin-based polymer that is a polymer including a structural unit of at least one polar olefin monomer represented by the general formula (I).

A polar olefin polymer used as a raw material for an olefin-based molded product of the present invention includes the structural unit of polar olefin monomer preferably at 20 mol % or more, more preferably 30 mol % or more, 40 mol % or more, 50 mol % or more, 60 mol % or more, 70 mol % or more, or 80 mol % or more in terms of molar ratio.

Although the molecular weight distribution of a polymer is arbitrary, a polymer having a relatively narrow polymer molecular weight distribution can also be used favorably. In this regard, the molecular weight distribution may be a value (Mw/Mn) measured by a GPC method (measured at 145° C. using polystyrene as a standard substance, and 1,2-dichlorobenzene as an eluent), or the like, which may be measured, for example, using a GPC measuring device (TOSOH HLC 8321 GPC/HT).

The molecular weight distribution of a polymer in terms of Mw/Mn as an index is usually 5.0 or less, and preferably 4.0, or less, or 3.0 or less.

The number average molecular weight of a polymer is arbitrary, and a polymer having a relatively high number average molecular weight of polymer can also be favorably used. Although the number average molecular weight (g/mol) varies depending on the structure of a structural unit derived from the polar olefin monomer, the proportion of a structural unit derived from the polar olefin monomer, or the like, it is usually $2.0 \times 10^3$ or higher, and preferably $3.0 \times 10^3$ or higher, $10 \times 10^3$ or higher, $50 \times 10^3$ or higher, $80 \times 10^3$ or higher, $100 \times 10^3$ or higher, $150 \times 10^3$ or higher, $200 \times 10^3$ or higher, $250 \times 10^3$ or higher, $300 \times 10^3$ or higher, $350 \times 10^3$ or higher, $400 \times 10^3$ or higher, $450 \times 10^3$ or higher, $500 \times 10^3$ or higher, or $1000 \times 10^3$ or higher from the viewpoint of achieving a high level of mechanical characteristics as described above, autonomous self-healing function, or characteristics such as shape-memory property.

The glass transition point (Tg) of a polymer may vary depending on the structure of the structural unit derived from a polar olefin monomer. Although the glass transition point is not particularly limited, it is usually about −40 to 100° C. A glass transition point can be measured by differential scanning calorimetry (DSC) or the like. For obtaining a self-healing molded product, the Tg of the polymer used as a raw material is preferably not higher than room temperature (generally 25° C., which may vary depending on the utilized mode and conditions). For obtaining a shape-memory molded product, the Tg of the polymer used as a raw material is preferably higher than room temperature (generally 25° C., which may vary depending on the utilized mode and conditions).

When a polymer has a melting point, it may vary depending on the structure of the structural unit derived from a polar olefin monomer, the proportion of the structural unit derived from a polar olefin monomer, or the like, however it is usually 100° C. or higher, and preferably 110° C. or higher, 120° C. or higher, or 130° C. or higher. A melting point can be measured by, for example, the differential scanning calorimetry (DSC).

As an embodiment of the polar olefin-based polymer, a copolymer of the polar olefin monomer and ethylene (nonpolar olefin monomer) will be exemplified. The copolymer is a copolymer including a structural unit derived from a polar olefin monomer represented by the following formula (A), and a structural unit derived from ethylene represented by the formula (B).

In this regard, Z, $R^1$, $R^2$, and n in the formula (A) are the same as Z, $R^1$, $R^2$, and n described above in connection with the general formula (I).

In the copolymer, the structural units respectively represented by the above formulas (A) and (B) may be aligned in any order. That is, both may be aligned at random, or aligned with some regularity (for example, the structural units of (A) and (B) are alternatingly aligned, some units of each are aligned serially, or they may be aligned in another fixed order). Therefore, the copolymer may be a random copolymer, an alternating copolymer, a block copolymer, or another ordered copolymer. The copolymer is preferably an alternating copolymer.

An alternating copolymer is constituted with the main sequence in which the structural units of (A) and (B) are aligned alternatingly (hereinafter also referred to as "alternating (A)-(B) sequence" or "(A)-alt-(B) sequence"), but it may in some cases include as a sub-sequence a sequence in which two to several of the respective units are aligned serially. The copolymer is an alternating copolymer, and the proportion of the alternating (A)-(B) sequence in the total sequences of the copolymer (in a case where two or more kinds of structural units of polar olefin monomers and two or more kinds of structural units of nonpolar olefin monomers are included, the proportion of the total alternating sequences constituted with structural units of the polar olefin monomers and structural units of the nonpolar olefin monomers) in terms of molar ratio is usually 30 mol % or more, and preferably 40 mol % or more, 50 mol % or more, 60 mol % or more, or 70 mol % or more.

More specifically, in the embodiment of an alternating polymer, in addition to the alternating sequence -(A)-alt-(B)-, polymerization sequence of each of (A) or (B) may be included. When the polymerization sequence of (B), i.e. -(B)-(B)-. is included together with the alternating sequence -(A)-alt-(B)-, this constitution conceivably contributes to development of functionality of the molded product of the present invention, as described later. The proportion of the polymerization sequence of (B) (-(B)-(B)-) with respect to the total sequences of the copolymer (in a case where structural units of two or more kinds of nonpolar olefin monomers are included, a random copolymer, an alternating copolymer, a block copolymer, or another ordered copolymer constituted with structural units of two or more kinds of nonpolar olefin monomers is also included) in terms of molar ratio is usually 60 mol % or less, and preferably 50 mol % or less, 40 mol % or less, 30 mol % or less, or 20 mol % or less. Meanwhile, the proportion of the polymerization sequence of (A), i.e. -(A)-(A)-. with respect to the total sequences of the copolymer (in a case where structural units of two or more kinds of polar olefin monomers are included, a random copolymer, an alternating copolymer, a block copolymer, or another ordered copolymer constituted with structural units of two or more kinds of polar olefin monomers is also included) in terms of molar ratio is preferably 20 mol % or less, 10 mol % or less, 5 mol % or less, or 3 mol % or less, and may be even 0 mol %.

The proportion of the sequence can be measured, for example, by $^1$H-NMR, or $^{13}$C-NMR. Specifically, it can be determined by comparing the integration ratios of peaks between 1.0 and 1.5 ppm by $^1$H-NMR.

The percentage of the structural unit of formula (A) or the structural unit of formula (B) included in the copolymer is arbitrary. For example, the proportion of the structural unit of formula (A) with respect to the total structural units in terms of molar ratio may be from 1 to 99 mol %. Further, by the above production method, a copolymer having a relatively high proportion of the structural unit of polar olefin monomer therein can be also prepared.

It is considered that in an olefin-based molded product of the present invention, in which the proportion of the structural unit of formula (A) is adequately high, the proportion of the alternating sequence (A)-(B) can be made adequately high, and consequently characteristics such as autonomous self-healing function, excellent mechanical properties, and shape-memory property can be exhibited. It is considered that an olefin-based molded product of the present invention can have an autonomous self-healing function, and a higher toughness owing to such characteristics of the copolymer. It can be said that to have such mechanical properties as high toughness is equivalent to well-balanced development of high enough tensile strength and high enough elongation at break. The proportion of the structural unit of polar olefin monomer in a copolymer, in terms of molar ratio the structural unit of formula (A) is usually 20 mol % or more, and preferably 30 mol % or more, 40 mol % or more, 50 mol % or more, 60 mol % or more, 70 mol % or more, or 80 mol % or more, from the viewpoints of achieving the aforedescribed characteristics such as high mechanical properties, autonomous self-healing function, and shape-memory property.

The proportion of the structural unit can be measured by, for example, $^1$H-NMR, or $^{13}$C-NMR. Specifically, it can be determined by $^1$H-NMR by comparing the integration ratio of methylene or methyl hydrogen adjacent to a hetero atom with that of a hydrocarbon present between 1 and 1.8 ppm. The proportion of the structural unit can be regulated by adjusting the ratio between each monomer that is a raw material in the production of the copolymer.

When the percentage of the structural unit of formula (A) is increased, favorable features of a polar group of the polar olefin monomer, such as the adhesiveness or compatibility with polar materials, can be effectively developed. Further, since the copolymer can be made to have a higher molecular weight, the entanglement points are increased, so that advantageous improvement of the compatibility or adhesiveness can be expected.

Although the molecular weight distribution of a copolymer is arbitrary, a copolymer having a relatively narrow copolymer molecular weight distribution can also be used favorably. In this regard, the molecular weight distribution may be a value (Mw/Mn) measured by a GPC method (measured at 145° C. using polystyrene as a standard substance, and 1,2-dichlorobenzene as an eluent), or the like, which may be measured, for example, using a GPC measuring device (TOSOH HLC 8121 GPC/HT).

The molecular weight distribution of a copolymer in terms of Mw/Mn as an index is usually 5.0 or less, and preferably 4.0 or less, or 3.0 or less.

The number average molecular weight of a copolymer is arbitrary, and a copolymer having a relatively high number average molecular weight of copolymer can also be favorably used. Although the number average molecular weight (g/mol) varies depending on the structure of a structural unit derived from the (non)polar olefin monomer, the proportions of a structural unit derived from the polar olefin monomer and a structural unit derived from the nonpolar olefin monomer, or the like, the number average molecular weight is usually $2.0 \times 10^3$ or higher, and preferably $3.0 \times 10^3$ or higher, $10 \times 10^3$ or higher, $50 \times 10^3$ or higher, $80 \times 10^3$ or higher, $100 \times 10^3$ or higher, $150 \times 10^3$ or higher, $200 \times 10^3$ or higher, $250 \times 10^3$ or higher, $300 \times 10^3$ or higher, $350 \times 10^3$ or higher, $400 \times 10^3$ or higher, $450 \times 10^3$ or higher, $500 \times 10^3$ or higher, or $1000 \times 10^3$ or higher from the viewpoint of achieving a high level of mechanical characteristics, autonomous self-healing function, or characteristics such as shape-memory property.

The glass transition point (Tg) of a copolymer may vary depending on the structure of the structural unit derived from a polar olefin monomer. Although the glass transition point is not particularly limited, it is usually about −40 to 100° C. A glass transition point can be measured by differential scanning calorimetry (DSC) or the like. For obtaining a self-healing molded product, the Tg of the copolymer used as a raw material is preferably not higher than the service temperature (for example, when the service temperature is room temperature it is generally 25° C., which may however vary depending on the utilized mode and conditions). For obtaining a shape-memory molded product, the Tg of the copolymer used as a raw material is preferably higher than the service temperature (for example, when the service temperature is room temperature it is generally 25° C., which may however vary depending on the utilized mode and conditions).

When a copolymer has a melting point, it may vary depending on the structure of the structural unit derived from a (non)polar olefin monomer, the proportions of the structural unit derived from a polar olefin monomer and the structural unit derived from a nonpolar olefin monomer, or the like, however it is usually 100° C. or higher, and preferably 110° C. or higher, 120° C. or higher, or 130° C. or higher. A melting point can be measured by, for example, differential scanning calorimetry (DSC).

One embodiment of the copolymer according to the present invention includes structural units respectively represented by the following formulas (III) and (IV). In the formula, x and y represent the proportion (molar ratio) of each structural unit with respect to the total sequences in the copolymer.

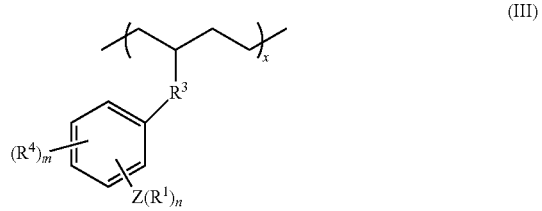

-continued

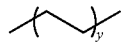

(IV)

In the formula, $R^1$, $R^3$, $R^4$, Z, m and n respectively have the same meanings as in the formula (II), and the same applies to the preferable ranges. Each of x and y stands for the proportion of each structural unit, and is a positive number that satisfies x>0, y>0, x>y, and 80%≤x+y≤100%. The x+y is preferably 85% or more, 90% or more, 95% or more, or 97% or more.

<Olefin-Based Molded Product>

An olefin-based molded product of the present invention is an olefin-based molded product comprising at least one polymer of a polar olefin monomer represented by the general formula (I). An embodiment of the olefin-based molded product of the present invention has an alternating ethylene-(substituted) anisylpropylene sequence, and develops an autonomous self-healing function and excellent mechanical properties. Concerning the mechanism for the development of the autonomous self-healing function and excellent mechanical properties, it is considered that a polar olefin copolymer has an alternating ethylene-(substituted) anisylpropylene, and (substituted) anisyl groups are regularly distributed as side chains in the skeleton of an alternating ethylene-propylene copolymer. This may have enhanced entanglement of molecules between damaged faces and polymer chains without being seriously affected by water, an acid, or a base. In an embodiment of the olefin-based molded product of the present invention, self-healing without the need for external energy or stimulation (pressure, temperature, etc.), namely autonomous self-healing is possible not only in air but also in water, or an acid or basic solution. Although for the self-healing function of the olefin-based molded product of the present invention, external energy or stimulation (pressure, temperature, etc.) is not particularly required, they may be applied also. When external energy or stimulation (pressure, temperature, etc.) is applied, advantages such as acceleration of the self-healing speed may be expected.

In this regard, "self-healing" means return to the shape and physical properties before the damage, for example, by bringing damaged parts, such as a flaw of a molded product or cut surfaces, in contact with each other to regenerate entanglement of copolymer chains.

A self-healing function can be confirmed by comparing the shape and physical properties after the damage and after bringing damaged parts in contact with each other, and allowing them to stand at a predetermined temperature in a predetermined environment for a predetermined time, with the same before the damage. Specifically, it can be confirmed, for example, by the method described in Example below. The self-healing efficiency of the olefin-based molded product of the present invention varies depending on the kind of a copolymer used, or the like, and is not particularly limited. For example, in the self-healing test according to the method described in Example below, in which damaged parts of the olefin-based molded product are brought into contact with each other, and left standing at room temperature (for example, 25° C.) in air to make self-healing occur autonomously, the elongation at break after the damage with respect to the elongation at break before the damage becomes usually 50% or more, and preferably 60% or more, 70% or more, 80% or more, 90% or more, 95% or more, 99% or more, and 100%.

One embodiment of a self-healing molded product is a molded product containing the copolymer, which includes structural units represented by the formulas (III) and (IV) respectively, and has a Tg of not higher than the service temperature (for example, if the service temperature is room temperature, it is generally 25° C.).

With respect to an embodiment of a molded product of the present invention to be used as a self-healing material, a self-healing rate of 80% or more is achievable.

There is no particular limitation on the time required for achieving such self-healing rate, and it may be adjusted depending on the kind of polymer used (more specifically, on the kind of the substituent of the benzene ring in the formula (III), the ranges of x and y, and the molecular weight, in the embodiment containing a copolymer including structural units represented by the formulas (III) and (IV) respectively), or the like. In one example, a self-healing rate of 80% or more can be achieved in 5 days.

One embodiment of the olefin-based molded product of the present invention is an olefin-based molded product having a shape-memory function.

In this regard, the "shape-memory function" means a nature that, when a primarily shaped olefin-based molded product is deformed by an external force at a temperature below the temperature at which primary shaping was conducted but not below the glass transition temperature, and the deformed shape is fixed (secondary shaping) at a temperature not above the glass transition temperature, the olefin-based molded product keeps the secondary shape at a temperature not above the glass transition temperature, but returns to (recovers) the primary shape when it is heated to a temperature of the glass transition temperature or higher under no-load.

The shape-memory function can be confirmed by, for example, deforming an olefin-based molded product at a predetermined temperature, keeping it in the deformed state, and allowing it to recover, and comparing the shape after recovery with that before deformation. Specifically, it can be confirmed, for example, by the method described in Example below. The shape fixed rate and the shape recovery rate showing the shape-memory performance can be calculated based on the change of the rate of elongation by a thermomechanical analysis (TMA). The former can be calculated as the ratio (E2'/E2) of the rate of elongation E2' when fixed at a temperature below Tg to the rate of elongation E2 immediately after deformation at a temperature of Tg or higher. The shape recovery rate can be calculated as the ratio (E1'/E1) of the rate of elongation E1' recovered at a temperature of Tg or higher through the deformation and fixation to the rate of elongation E1 returning to the original shape. Specifically, they are values that can be calculated from the results of thermal analysis. For example, FIG. 40 described later shows that a sample was heated to 50° C., stretched by 100%, and then cooled to 0° C. to fix the sample in that state realizing a shape fixed rate of 99.5%. Further, it shows that the tensile load was then removed to zero and the sample was heated to 50° C. allowing it to heal realizing a shape fixed rate of 99.1%.

In an embodiment of the shape-memory molded product, it maintains a constant shape S1 at a service temperature Tu (for example, room temperature), it can be deformed to the shape S2 by applying an external force at a temperature Td higher than Tg (Tu<Tg) (and when there is a melting point, at a temperature below the melting point), it can maintain the shape S2 when it is cooled to the service temperature Tu in the shape S2, and can be used in the shape, and it has ability to return to the original shape S1 at the temperature Tr (Tr may be the same as or different from Td) which exceeds Tg (and below the melting point, when it has one). In other words, the embodiment of the shape-memory molded product can be easily deformed to a shape S2 different from the original shape S1 by applying an external force at a temperature Td which exceeds Tg (Tu<Tg), and when it is cooled to Tu, the shape S2 is maintained to manifest the shape fixing property ($R_f$), and when it is heated to a temperature Tr which exceeds Tg (Tu<Tg) without applying any external force, the shape is returned to the original shape S1 to manifest also the shape recovering property ($R_r$). An embodiment of a shape-memory molded product is a molded product containing a copolymer, which includes structural units represented by the formulas (III) and (IV) respectively, and has a Tg as high as the service temperature (for example, when the service temperature is room temperature about room temperature (e.g., 15° C. to 35° C.)), or beyond the service temperature.

One embodiment of a molded product of the present invention used as a shape-memory material can achieve a shape fixed rate and a shape recovery rate of 50% or more respectively, and can preferably achieve 80% or more, respectively.

Polar olefin-based polymers contained in an olefin-based molded product of the present invention cover a wide glass transition temperature range, and exhibit at room temperature (for example, 25° C.) a variety of mechanical properties (rigid plastic, flexible plastic, elastomer, or stress softening material) depending on the glass transition temperature. For example, as described in Examples below, P5 having a glass transition temperature of 6° C., P7 of 4° C., and P8 of 11° C. are elastomers at room temperature (FIG. 33A). This elastomer exhibits excellent mechanical properties, and particularly superior in toughness, tensile strength, and elongation at break.

The toughness value of an olefin-based molded product varies depending on the kind of a polymer used (more specifically, in an embodiment containing a copolymer including structural units represented by the formulas (III) and (IV) respectively, the kind of a substituent of the benzene ring in the formula (III), the ranges of x and y, and the molecular weight), or the like, and is not particularly limited. It may be adjusted to an appropriate range depending on the intended use. When a polar olefin-based polymer having a larger molecular weight (Mn) is used as a raw material, the toughness value of the obtained molded product tends to increase. For example, by a measurement at a temperature not below the glass transition temperature where the polymer exhibits a rubber state (as an example, room temperature (for example, 25° C.)), the toughness of a molded product of the present invention usually exceeds 0.25 $MJ/m^3$, and 0.5 $MJ/m^3$ or more is achievable. For yielding a self-healing molded product, the toughness is preferably 1 $MJ/m^3$ or more, 5 $MJ/m^3$ or more, 10 $MJ/m^3$ or more, 20 $MJ/m^3$ or more, or 30 $MJ/m^3$ or more. Not limited to room temperature, an embodiment which exhibits a toughness within the above range at the service temperature of the molded product is also acceptable.

The tensile strength of the olefin-based molded product varies depending on the kind of a polymer used (more specifically, in an embodiment containing a copolymer including structural units represented by the formulas (III) and (IV) respectively, the kind of a substituent of the benzene ring in the formula (III), the ranges of x and y, and the molecular weight), or the like, and is not particularly limited. It may be adjusted to an appropriate range depending on the intended use. When a polymer having a higher glass transition point is used as a raw material, the tensile strength of the obtained molded product tends to increase. For example, by a measurement at a temperature not below the glass transition temperature where the polymer exhibits a rubber state (as an example, room temperature (for example, 25° C.)), the molded product of the present invention can achieve 0.1 MPa or higher. The tensile strength is preferably higher than 0.4 MPa, 0.5 MPa or more, 1 MPa or more, 10.0 MPa or more, 20 MPa or more, 30 MPa or more, 40 MPa or more, or 50 MPa or more. Not limited to room temperature, an embodiment which exhibits a tensile strength within the above range at the service temperature of the molded product is also acceptable.

The elongation at break of the olefin-based molded product varies depending on the kind of a polymer used (more specifically, in an embodiment containing a copolymer including structural units represented by the formulas (III) and (IV) respectively, the kind of a substituent of the benzene ring in the formula (III), the ranges of x and y, and the molecular weight), or the like, and is not particularly limited. It may be adjusted to an appropriate range depending on the intended use. When a polymer having a higher glass transition point is used as a raw material, the elongation at break of the obtained molded product tends to decrease. For example, by a measurement at a temperature not below the glass transition temperature where the polymer exhibits a rubber state (as an example, room temperature (for example, 25° C.)), the molded product of the present invention can achieve about 10% or more. For yielding a self-healing molded product, the elongation at break is preferably more than 100%, 500% or more, 1000% or more, 1200% or more, 1500% or more, or 2000% or more. For stably obtaining a self-healing ability, the upper limit value is about 10000%. Not limited to room temperature, an embodiment which exhibits an elongation at break within the above range at the service temperature of the molded product is also acceptable.

The mechanical properties of a polar olefin-based polymer can be measured by a conventional tensile test. Specifically, for example, the test is conducted using the method described in Example below (using a dumbbell specimen (width: 2 mm; length: 12 mm; thickness: 1 mm) based on JIS K-6251-7 according to the test method of ASTM 882-09). A breaking stress-breaking strain test is based on fracture using a uniaxial tensile test with a strain rate of 200 mm/min. A toughness value can be calculated by calculating the area of the stress-strain curve.

The olefin-based molded product of the present invention may be an olefin-based molded product containing a polar olefin-based polymer as a main component (50% by mass or more), or an olefin-based molded product containing it as a subcomponent (less than 50% by mass). A polymeric material such as a (co)polymer other than a polar olefin-based polymer, as well as various additives usually used for a molded product, such as an excipient, a lubricant, a UV absorbent, a weathering stabilizer, an antistatic agent, an antioxidant, a heat stabilizer, a nucleating agent, a flow improver, and a colorant, may be included.

The olefin-based molded product of the present invention is preferably produced by melt-molding a polar olefin-based polymer. The melt molding may be performed by a publicly known method. Examples of such melt molded product include, but not limited to, an injection molded product, a vacuum, or air pressure formed product, an extrusion molded product, a blow molded product, a hot press (melt press) molded product, and a cast molded product; and specifically pellet, fiber and cloth, film, sheet, and nonwoven fabric. In addition, a molded product can be produced using laser processing, 3D printer technology, or the like.

(Film)

The present invention also relates to a film containing the polar olefin-based polymer. An embodiment of the film is a transparent film. A film which is one of the olefin-based molded products of the present invention can be formed by a publicly known method. For example, a molding method such as extrusion molding, hot press molding, and cast molding can be used. In the case of extrusion molding, a molten film material is extruded by using an extruder equipped with a T die, a circular die, or the like, and optionally further stretched or heat-treated to form a film.

In the case of hot press molding, a molten film material is pressed and cooled by using a hot plate press or the like, and optionally further stretched or heat-treated to form a film.

Also, an unstretched film is cast-molded by dissolving, casting, and drying and solidifying using a cosolvent for the film material, which may be optionally further stretched or heat-treated.

The formed unstretched film can be used as it is. As the film material, a material in which a polar olefin-based polymer and the aforedescribed various additives are melt-kneaded in advance may be used, or these may be melt-kneaded while molding is carried out.

The unstretched film can be longitudinally uniaxially stretched in the machine direction, or transversely uniaxially stretched in the cross-machine direction. Also, a biaxially stretched film can be produced by stretching by a successive biaxial stretching method with roll stretching and tenter stretching, a simultaneous biaxial stretching method with tenter stretching, a biaxial stretching method by tubular stretching, or the like. This film may be further subjected normally to a heat-fixing treatment after stretching in order to suppress heat shrinking, or the like. The obtained film may be optionally subjected to a surface activation treatment, or the like according to a publicly known method. Further, after being formed to a continuous long film, it may be stored/transported in a rolled-up state.

The film of the present invention may be used as it is as a molded product, or it may be used in combination with another kind of film or the like. Examples of the form of the combination include a combination with another kind of film, such as a layered body and a laminate as well as a combination with another molded product by overlaying or otherwise.

Figure 36:
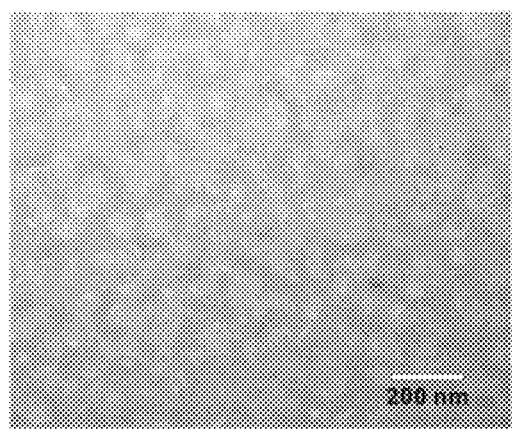
FIG. 36 is diagrams showing a state of a predetermined polymer contained in an example of a molded product of the present invention. A is a TEM image (photo). B is a schematic diagram, in which the curves represent alternating sequence chains -(A)-alt-(B)- of a polar olefinic monomer (A) such as anisylpropylene, and a nonpolar olefinic monomer (B) such as ethylene; and the circles represent crystalline nano domains formed by aggregation of homopolymerization sequences -(B)-(B)- of a nonpolar olefinic monomer (B) such as ethylene.
Figure 36:
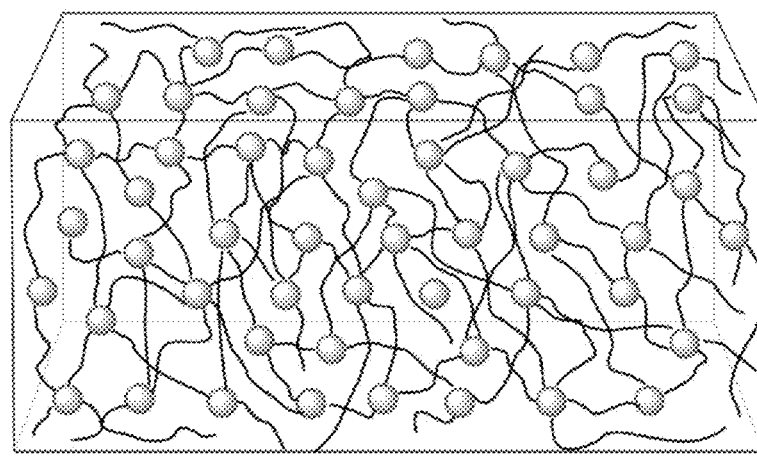

The state of the polymer in a molded product (for example, film) of the present invention is schematically shown in FIG. 36B. In the figure, a curve represents an alternating sequence chain -(A)-alt-(B)- of a polar olefinic monomer (A) such as anisylpropylene and a nonpolar olefinic monomer (B) such as ethylene; and a circle represents a crystalline nanodomain formed with homopolymerization sequences -(B)-(B)- of a nonpolar olefinic monomer (B) such as ethylene. Short chain -(B)-(B)- segments present in the copolymer according to the present invention are conceivably aggregated in a molded product (for example, film) to form a large number of crystalline nanodomains. This can be understood from the fact that an X-ray diffraction peak attributed to (110) plane of an orthorhombic crystal appears in a WAXD analysis. The mechanism by which a molded product of the present invention exhibits a unique self-healing ability is presumed as follows. In a molded product of the present invention, crystalline nanodomains are distributed in the matrix of flexible alternating sequence chains (-(A)-alt-(B)-), in which the crystalline nanodomains conceivably function as physical cross-linking points connecting flexible alternating sequence chains (-(A)-alt-(B)-). When a molded product sustains a mechanical damage, a crack or the like occurs to destroy partially the matrix of alternating sequence chains. It is considered however that repair of the damaged part progresses by re-aggregation of the crystalline nanodomains to facilitate reconstruction of the network structure of alternating sequence chains (-(A)-alt-(B)-).

The present invention also relates to a coating composition containing at least one kind of the (co)polymer according to the present invention. The coating composition can be used to form a film on various surfaces. The coating composition may include a liquid medium (either an aqueous system or an organic solvent system), or a solid medium together with the polymer. In an embodiment containing a medium, the polymer may be in a state dissolved in the medium, or in a non-dissolved (for example, dispersed) state. The performance, such as self-healing ability, derived from the polymer may be imparted to a part or all of the surface of an article, by applying the coating composition to at least a part of the surface of the article, and, if necessary, removing a medium by drying, to form a film.

EXAMPLES

The present invention will be specifically described below with reference to Examples, provided that the present invention is not limited to the embodiments of the following Examples.

Figure 2:
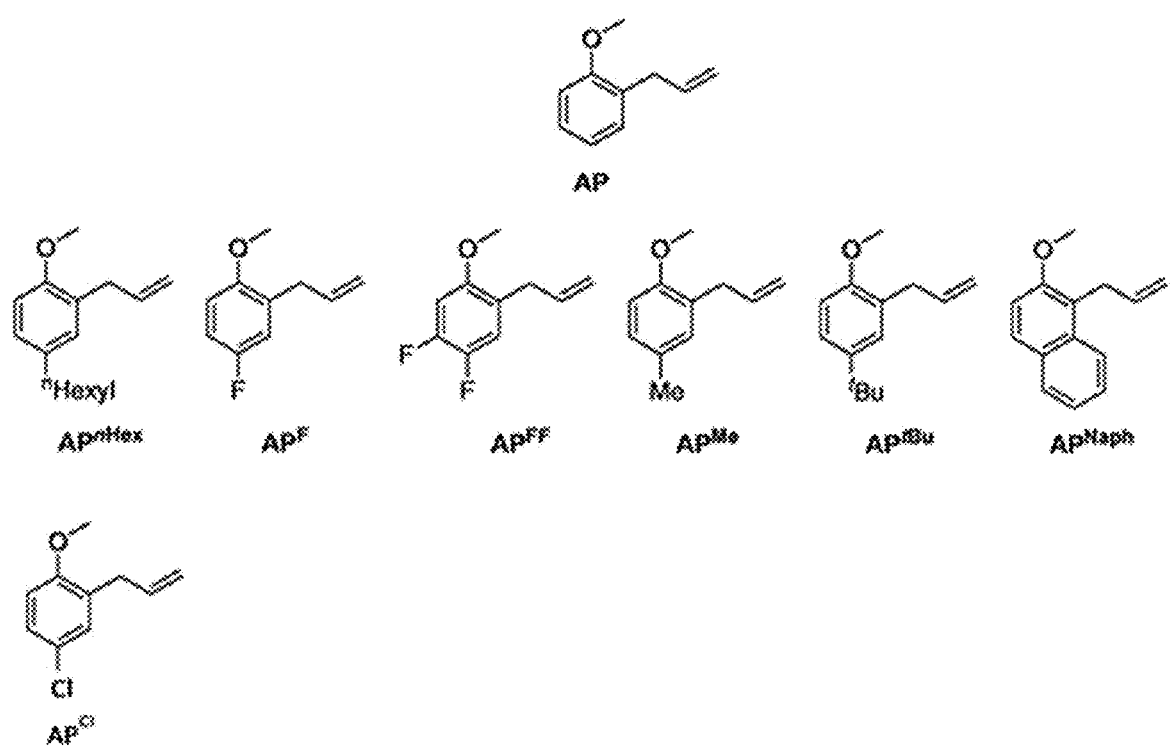
FIG. 2 is a diagram showing the structures of polar olefin monomers used in Examples.
Figure 3:
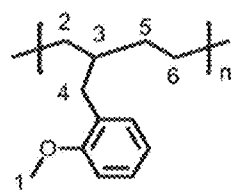
FIG. 3 is a diagram showing the analysis values and a $^1$H NMR spectrum of the polymer P2 obtained in Run 3 of Table 1.
Figure 3:
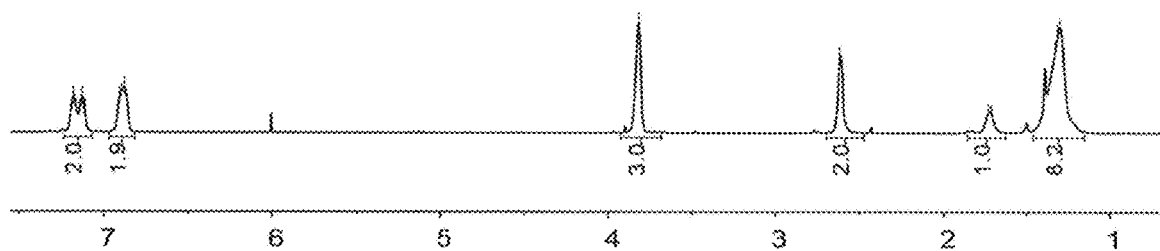
Figure 4:
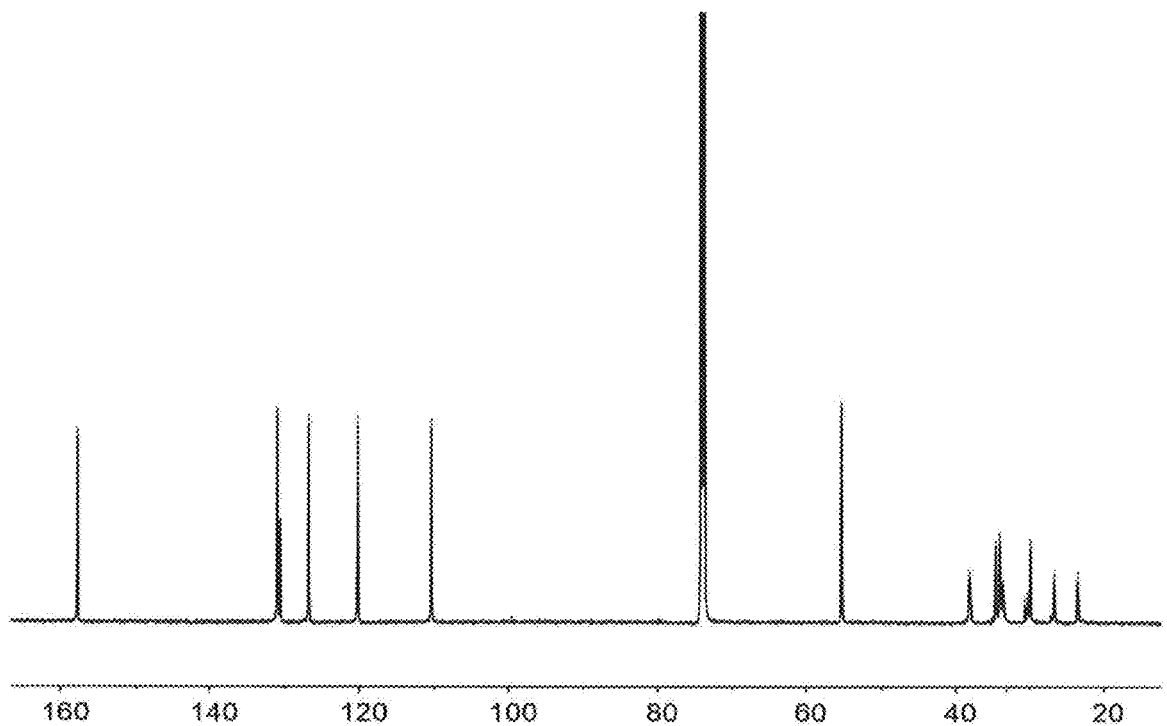
FIG. 4 is a diagram showing a $^{13}$C NMR spectrum of the polymer P2 obtained in Run 3 of Table 1.
Figure 5:
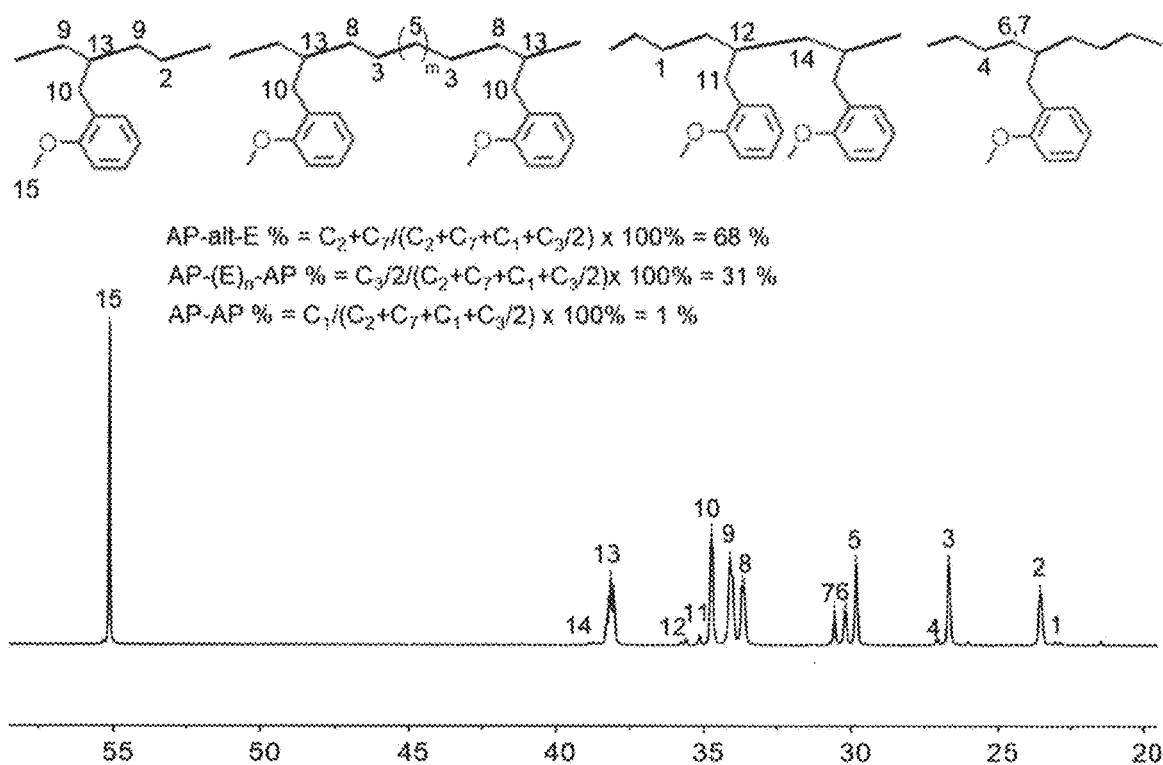
FIG. 5 is a diagram showing the analysis values and a partial enlarged view of $^{13}$C NMR spectrum of the polymer P2 obtained in Run 3 of Table 1.
Figure 6:
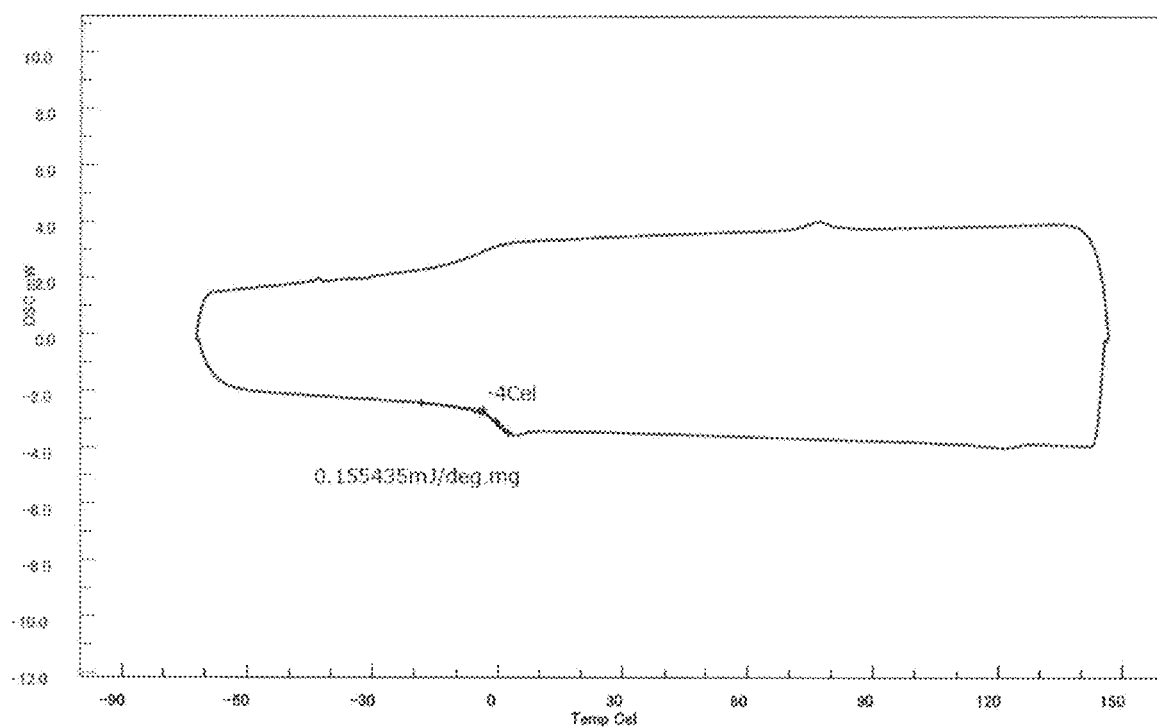
FIG. 6 is a diagram showing a DSC curve of the polymer P2 obtained in Run 3 of Table 1.

The present invention will be described below in detail with reference to Examples, provided that the scope of the present invention is not limited in any way by the following.
<Metallocene Complex>
The metallocene complexes used in Examples were synthesized according to the methods described in the following literature.
  (1) X. Li, M. Nishiura, K. Mori, T. Mashiko, Z. Hou, Chem. Commun., 4137-4139 (2007)
  (2) F. Guo, M. Nishiura, H. Koshino, Z. Hou, Macromolecules, 44, 6335-6344 (2011).
The metallocene complexes used in Examples are as follows:
  Complex 1: $(C_5H_5)Sc(CH_2C_6H_4NMe_2-o)_2$
  Complex 2: $(C_5Me_4SiMe_3)Sc(CH_2Cl_6H_4NMe_2-O_2$
The structures of the metallocene complexes used in Examples are shown in FIG. 1.
<Ionic Compound>
$[Ph_3C][B(C_6F_5)_4]$ (97%) was purchased from Strem Chemical Corporation and used without purification.
<Monomer>
All monomers were purified before use by distillation from $Al(octyl)_3$ (25 wt % in hexane), and Na, or by recrystallization from hexane. The structures of the polar olefin monomers used in Examples are shown in FIG. 2.
<Measurement Method>
(NMR)
The NMR data of a polymer was measured using a Bruker AVANCE III HD 500 NMR spectrometer (FT, 500 MHz: $^1H$; 125 MHz: $^{13}C$) and $CD_2Cl_2$ (26.8° C.) or $1,1,2,2\text{-}C_2D_2C_{14}$ (120° C.) as a solvent. A measurement of $^1H$ NMR was performed using tetramethylsilane (TMS) as the internal standard, and the chemical shifts of the respective solvents are as follows (7.26 ppm: $CDCl_3$, 7.16 ppm: $C_6D_6$, 5.32 ppm: $CD_2Cl_2$, and 6.0 ppm: $1,1,2,2\text{-}C_2D_2C_{14}$). Chemical shifts of $^{13}C$ NMR were reported with reference to the peak of each solvent [$CDCl_3$ (77.16 ppm), $CD_2Cl_2$ (53.84 ppm), $1,1,2,2\text{-}C_2D_2C_{14}$ (73.78 ppm), or $C_6D_6$ (128.06 ppm)]. Coupling constants (J) are shown in terms of Hz, which indicate overlap of the separated peaks. The abbreviations s, d, t, q, and m indicate singlet, doublet, triplet, quartet, and multiplet in each order.
(Gel Permeation Chromatography (GPC) Measurement)
The molecular weight and molecular weight distribution of a copolymer were determined by high temperature gel permeation chromatography (HT-GPC) at 145° C. using an HLC-8321GPC/HT device (Tosoh Corporation). The flow rate was set at 1.0 mL/min using 1,2-dichlorobenzene (DCB) as the eluting solvent. Calibration was performed using polystyrene standards (Tosoh Corporation).
(Differential Scanning Calorimetry (DSC) Measurement)
A DSC measurement was performed with a DSC 6220 (SII Corporation) at a speed of 10° C./min (unless otherwise specified). The thermal history error in a polymer was removed by heating a sample to 150° C. for the first time, cooling down at 10° C./min to about −100° C., and recording the second DSC scan (unless otherwise specified).
(Preparation of Film)
A copolymer film was prepared by melt-pressing at 160° C. under a pressure of 30 MPa for 5 min, and cooling down to 22° C. at 10° C./hour.
(Tensile Test)
The mechanical tensile stress test was performed using an Instron 3342 device (Instron). Three samples were tested for each polymer composition. The tensile test was conducted at room temperature (25±1° C.) by the test method according to ASTM 882-09 using a dumbbell specimen (width: 2 mm; length: 12 mm; thickness: 1 mm) according to JIS K-6251-7 (when the elasticity was evaluated, a different specimen size and strain rate were applied). The breaking stress-breaking strain test was carried out by causing a fracture by means of a uniaxial tensile test at a strain rate of 200 mm/min. Young's modulus was defined as the initial slope of the linear region (0<ε<0.05) in a nominal stress-nominal strain curve, and calculated as the average of 3 monotone curves. A toughness value was determined by calculating the area of the stress-strain curve. The stress-strain cycle test was performed at a strain rate of 200 mm/min and a release rate of 20 mm/min. The strain recovery was determined by a 1000% strain cycle test according to the formula: $100(\varepsilon_a - \varepsilon_r)/\varepsilon_a$, where $\varepsilon_a$=applied strain, and $\varepsilon_r$=strain without load after 10 cycles.
<Self-Healing Test>
As a self-healing test, a sample was cut into completely separate portions using a razor blade. The fractured surfaces of the film were allowed to be jointed for different time durations in air, water, a HCl aqueous solution, and a NaOH aqueous solution. In other words, the cut faces were jointed and pressed lightly for about 15 sec, and then allowed to heal at 25° C. for each time duration. The stress-strain curves were obtained by the above method for the healed copolymer films. The mechanical repair efficiency η was determined as the ratio of the healed fracture strain to the original fracture strain.

[Example 1] Copolymerization of 2-Allylanisole (AP) with Ethylene (Table 1, Run 3)

In a glove box, a toluene solution (1.0 mL) of $[Ph_3C][B(C_6F_5)_4]$ (9.3 mg, 10 μmol) was added gradually to a toluene solution (1.0 mL) of $(C_5Me_4SiMe_3)Sc(CH_2C_6H_4NMe_2-o)_2$ (complex 2, 5.1 mg, 10 μmol) in a 10 mL glass tube under stirring with a magnetic stirrer. AP (0.74 g, 5.0 mmol in 150 mL toluene) was charged into a three necked flask. The flask was taken out, placed in a water bath (25° C.), and connected with an ethylene Schlenk line and a mercury sealed valve which were thoroughly cleaned by purging using a three-way cock. Ethylene was introduced into the system and the solution was stirred for 1 min to be saturated therewith. A catalyst solution was added using a sealed syringe under vigorous stirring. When the viscosity of the reaction solution increased (5 min), methanol (50 mL) was added to stop the polymerization reaction. The polymer was recovered by filtration, washed with methanol, and dried under reduced pressure at 60° C. for 24 hours to yield a colorless rubbery substance (0.91 g). The measurement results of the physical properties of the yielded polymer are shown in Table 1.

As shown in Table 1, the complex, the ratio of the monomer to the catalyst, the reaction time, etc. were changed, and the polymerization reaction was performed in the same manner as the copolymerization of AP and ethylene described above. The measurement results of the physical properties of the obtained polymers are shown in Table 1 and FIGS. 3 to 6.

With Complex 1 a copolymer was not yielded, but a highly syndiotactic homopolymer was yielded. This is presumably because the AP monomer was preferentially coordinated with the complex 1 due to use of a catalyst having sterically small ligands, and its polymerization proceeded. When a sterically bulky Complex 2 was used, a copolymer product (P1) of ethylene-2-allylanisole (E-AP) was exclusively obtained (Table 1, run 2). Setting E at 1 atm, as the [O]/[M] ratio was increased from 200/1 to 500/1, 1000/1, 2000/1, and 5000/1, the number average molecular weights (Mn) of the obtained copolymers (P1 to P5) were increased remarkably, while the introduction rates of the AP monomer into the copolymer were maintained with a slight increase (Table 1, runs 2 to 6).

It was shown by a $^{13}C\{^1H\}$ NMR analysis, that the copolymers (P1 to P5) mainly had an alternating AP-E sequence (67 to 76%), together with some AP-$(E)_n$-AP sequence (n≥2, 19 to 33%), and E-AP-AP-E sequence (0 to 5%). In the following formulas, each copolymer was schematically expressed only by an alternating AP-E sequence, which was the main sequence. Further, the copolymers (P1 to P5) were amorphous and had a glass transition temperature.

The reason why the copolymer having the aforedescribed unique structure was obtained with the complex 2 is presumably that the copolymerization proceeded according to the following scheme. In the following scheme, the counter anion $[B(C_6F_5)_4]^-$ was omitted.

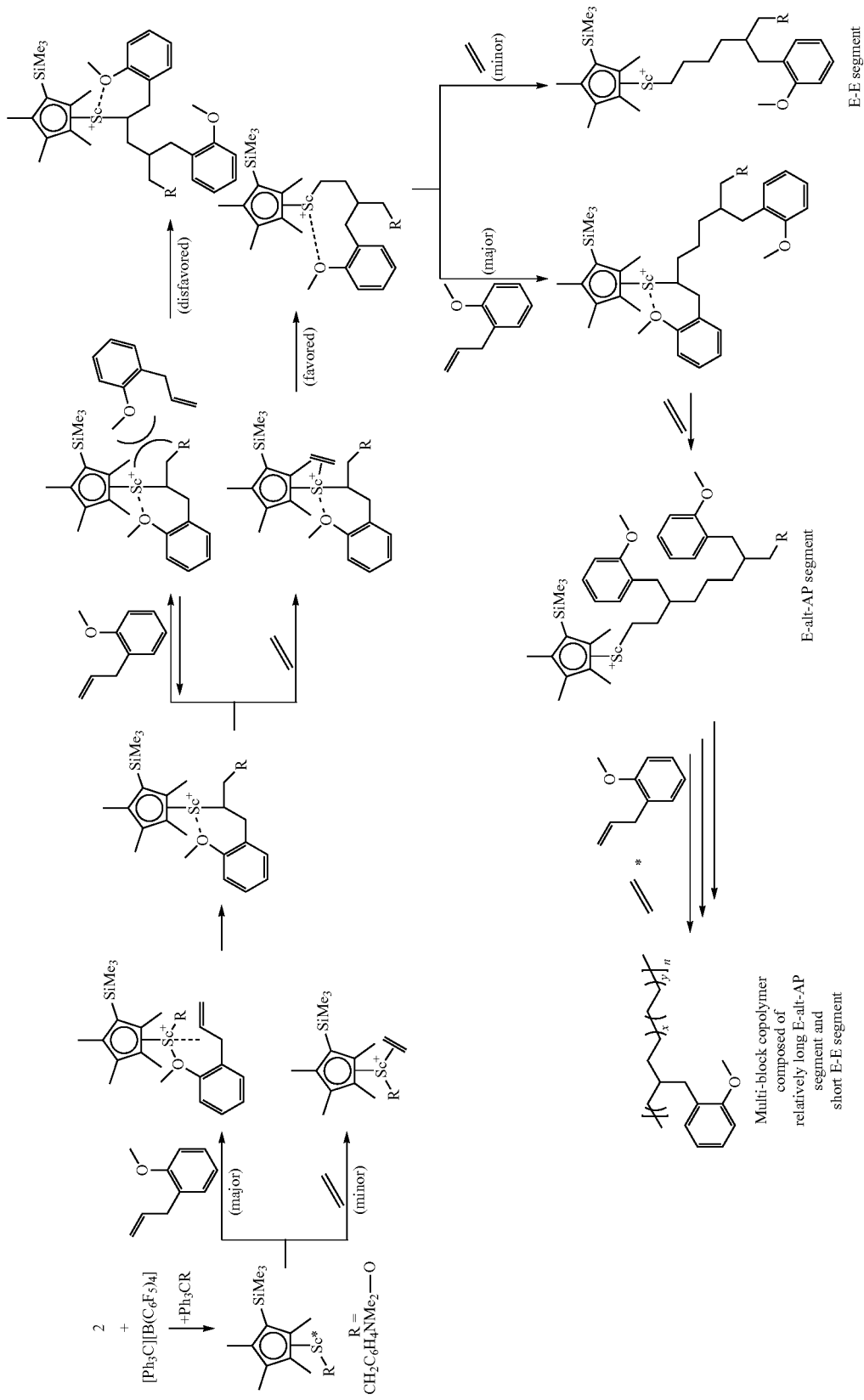

TABLE 1

| Run[a] | [M] | [O]/[M][b] | Yield (g)[c] | Time | Activity (g mol-Sc$^{-1}$h$^{-1}$ atm$^{-1}$) | $M_n$ (10$^3$ g mol$^{-1}$)[d] | $M_w/M_n$[d] | AP/E[e] | $T_g$[f] |
|---|---|---|---|---|---|---|---|---|---|
| 1[h] | 1 | 200/1 | 0.20 | 10 min | — | 5 | 1.65 | 100/0h | 60 |
| 2[g] | 2 | 200/1 | 0.70 | 15 min | 1.4 × 10$^5$ | 41 (P1) | 1.68 | 39/61 | −8 |
| 3 | 2 | 500/1 | 0.91 | 5 min | 1.1 × 10$^6$ | 90 (P2) | 1.58 | 39/61 | −6 |
| 4 | 2 | 1000/1 | 1.61 | 15 min | 6.4 × 10$^5$ | 173 (P3) | 1.94 | 41/59 | 4 |
| 5 | 2 | 2000/1 | 3.05 | 6 h | 5.1 × 10$^4$ | 344 (P4) | 1.70 | 45/55 | 5 |
| 6 | 2 | 5000/1 | 8.35 | 24 h | 3.5 × 10$^4$ | 552 (P5) | 1.98 | 46/54 | 6 |

[a]Condition: [M] (0.01 mmol). [Ph3C][B(C6F5)4] (B) (0.01 mmol), ethylene (1 atm), 150 mL toluene, 20° C. (unless otherwise specified)
[b]Feed ratio (mole) of AP to scandium complex
[c]Polymer product weight (g)
[d]Determined by GPC in 140° C. o-dichlorobenzene with reference to polystyrene standards: Mn = number average molecular weight, Mw = weight average molecular weight
[e]The molar ratio of AP to E in the copolymer was determined by 1H NMR analysis.
[f]Determined by DSC
[g][M] = [B] = 0.02 mmol, 50 mL toluene
[h]Syndiotactic polymer of AP

[Example 2] Physical Properties of E-AP Copolymers (P1 to P5)

A film was prepared using each copolymer P1 to P5. The measurement results of the physical properties of the prepared films are shown in Table 2 and FIGS. 7 and 8.

Figure 7:
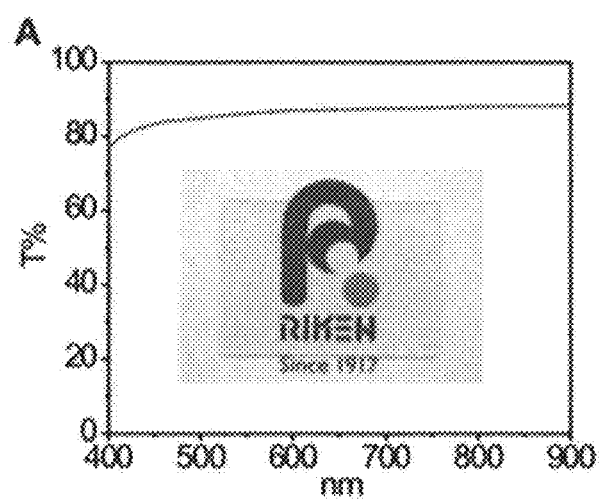
FIG. 7 is a diagram showing a transmission spectrum of a 0.5 mm-thick film sample of the copolymer P2. A diagram (photo) of the film placed on a logo is shown inside.
Figure 8:
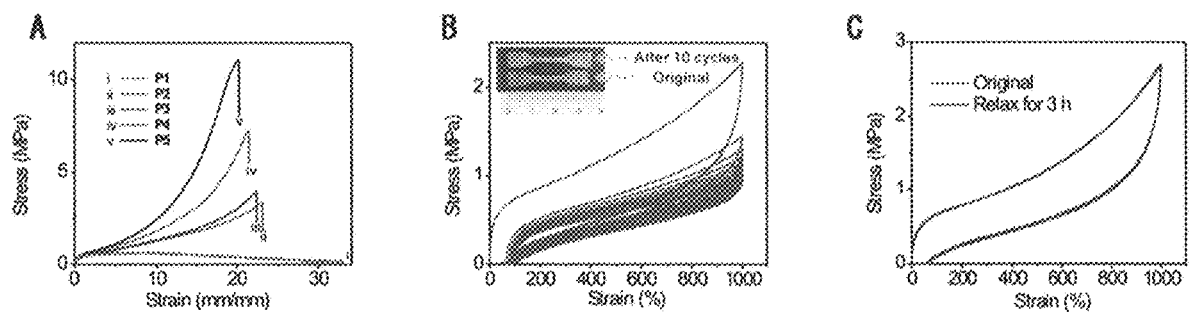
FIG. 8 is diagrams showing the mechanical properties concerning the copolymers P1 to P5. A of FIG. 8 shows stress-strain curves at a testing rate of 200 mm·min$^{-1}$. B of FIG. 8 shows tensile strength/hysteresis curves of the copolymer P5. Ten cycles of 1000% elongation were performed. The photo (top) after ten cycles of 1000% elongation and healing, and the photo (bottom) of the original state are also shown in the diagram. C of FIG. 8 is a tensile strength/hysteresis curve (first cycle) of the original sample of the copolymer P5 and the sample after 1000% elongation and 3-hour relaxation.
Figure 9:
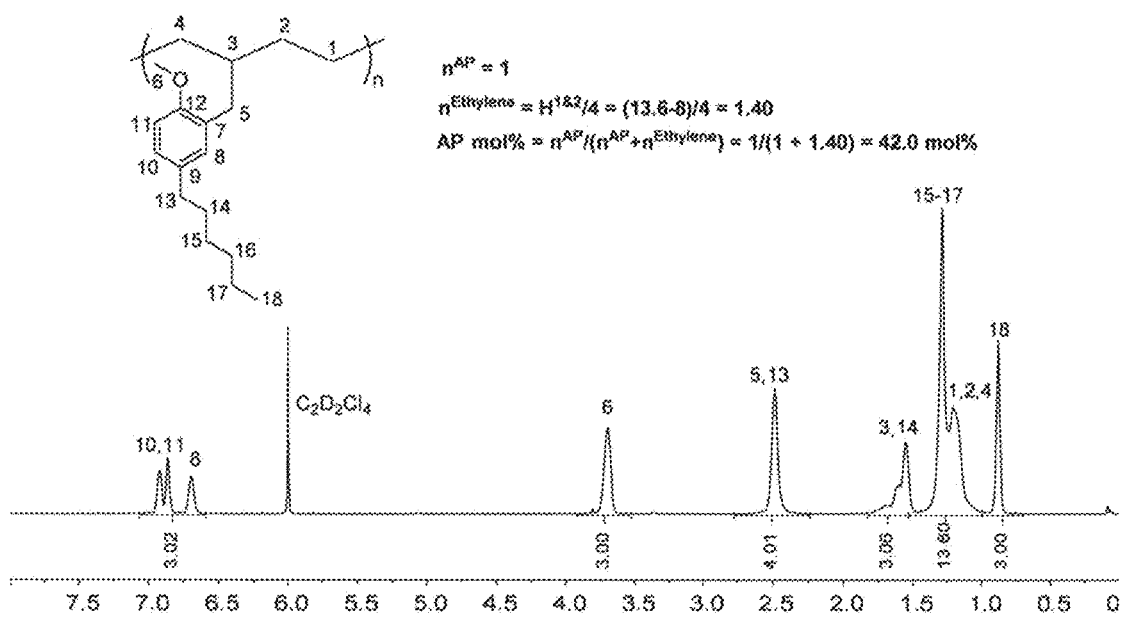
FIG. 9 is a diagram showing the analysis values and a $^1$H NMR spectrum of the polymer P6 obtained in Run 5 of Table 3.
Figure 10:
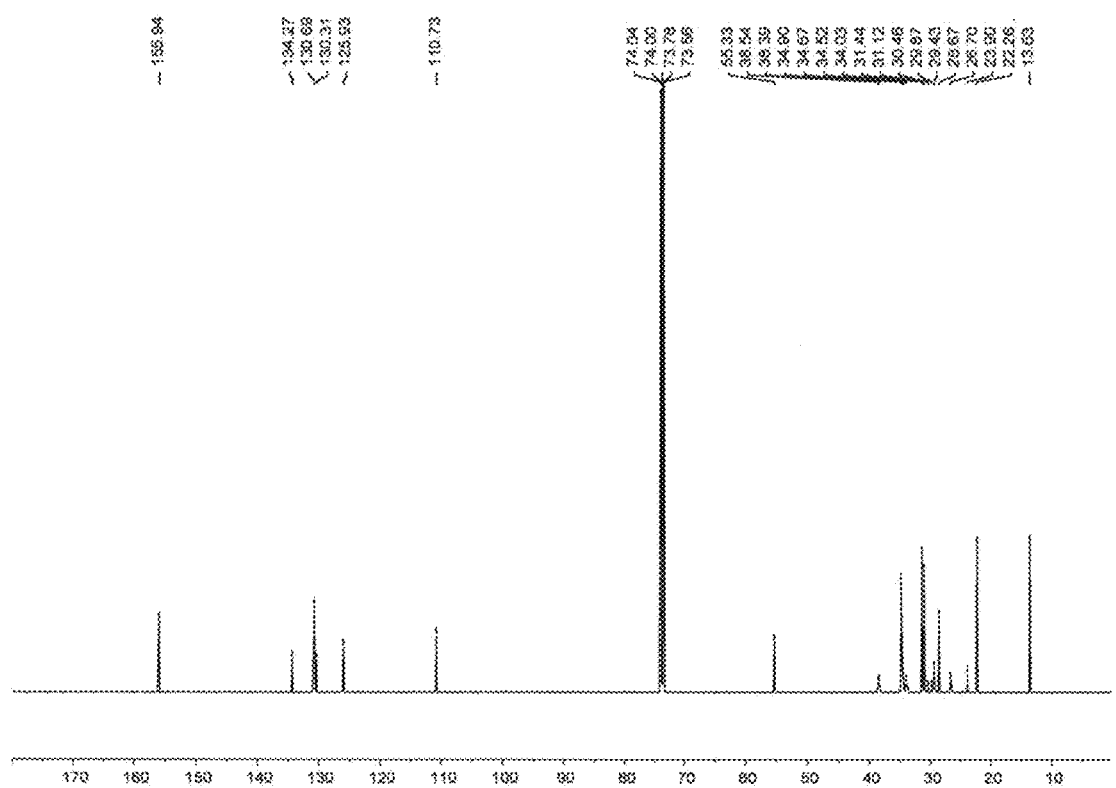
FIG. 10 is a diagram showing a $^{13}$C NMR spectrum of the polymer P6 obtained in Run 5 of Table 3.
Figure 11:
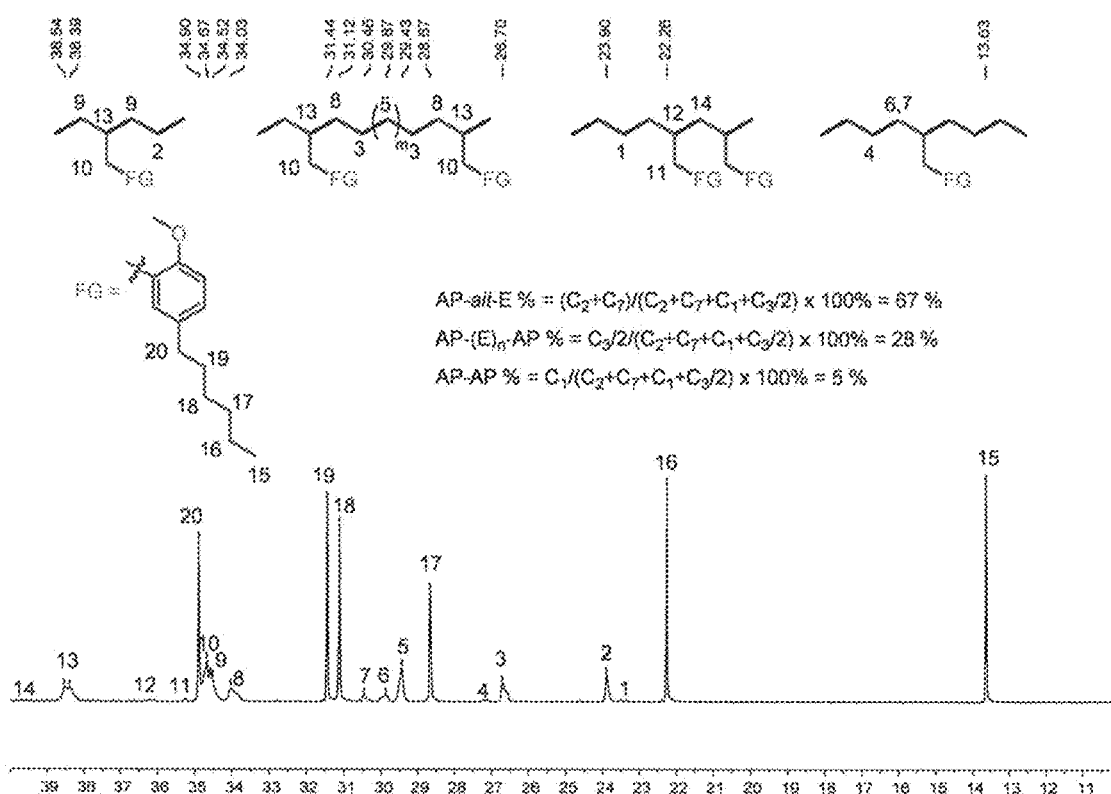
FIG. 11 is a diagram showing the analysis values and a partial enlarged view of a $^{13}$C NMR spectrum of the polymer P6 obtained in Run 5 of Table 3.
Figure 12:
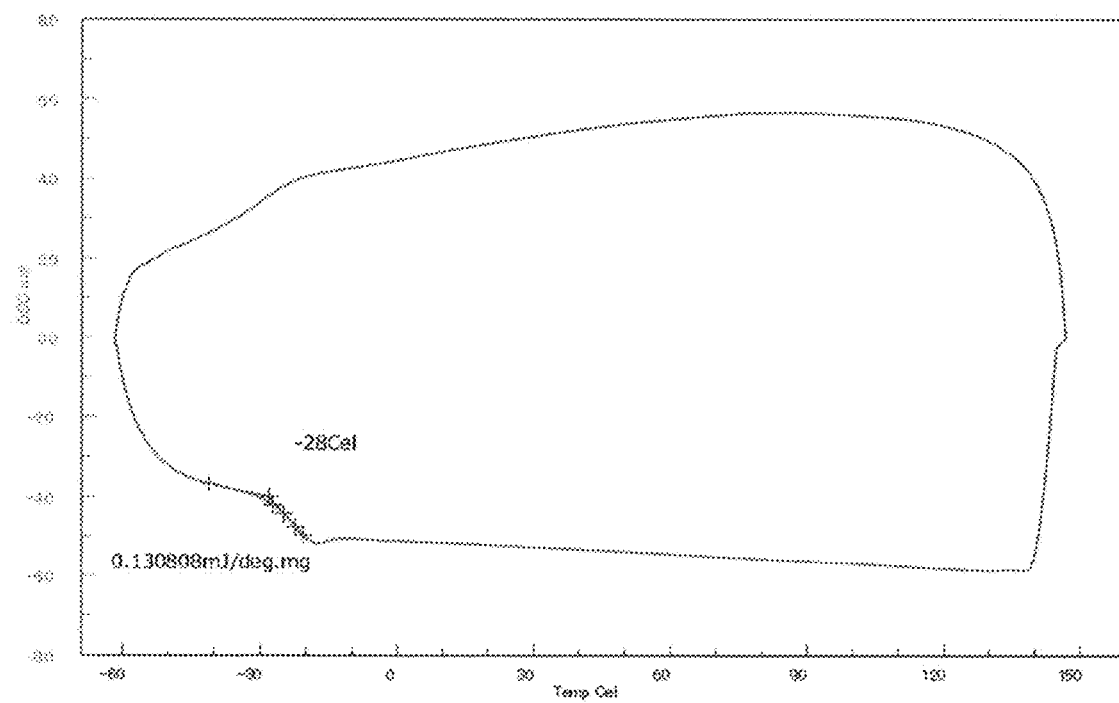
FIG. 12 is a diagram showing a DSC curve of the polymer P6 obtained in Run 5 of Table 3.
Figure 13:
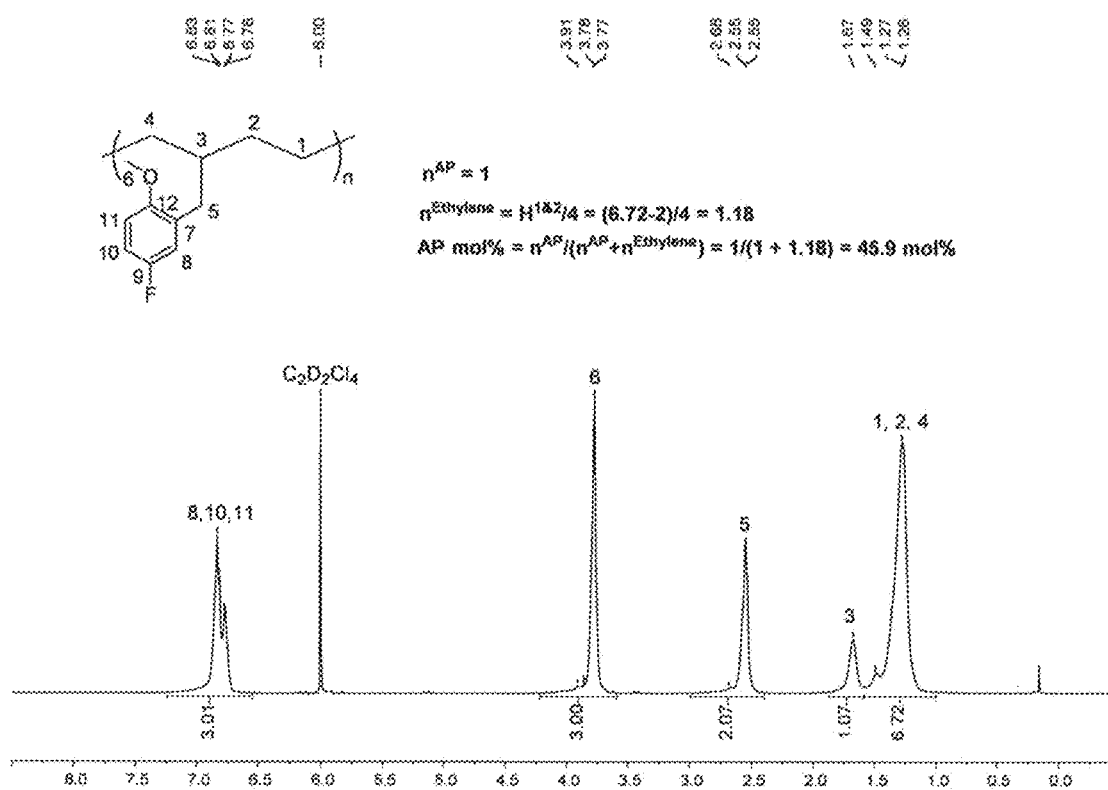
FIG. 13 is a diagram showing the analysis values and a $^1$H NMR spectrum of the polymer P7 obtained in Run 7 of Table 3.
Figure 14:
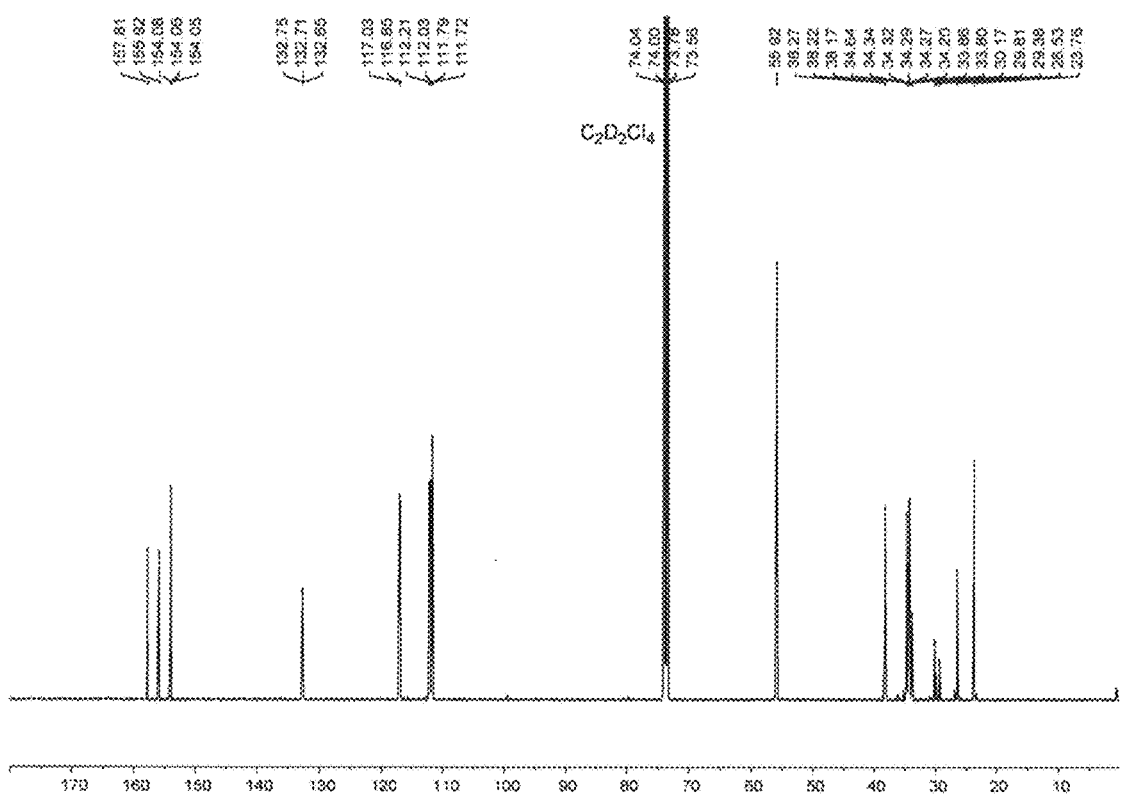
FIG. 14 is a diagram showing a $^{13}$C NMR spectrum of the polymer P7 obtained in Run 7 of Table 3.
Figure 15:
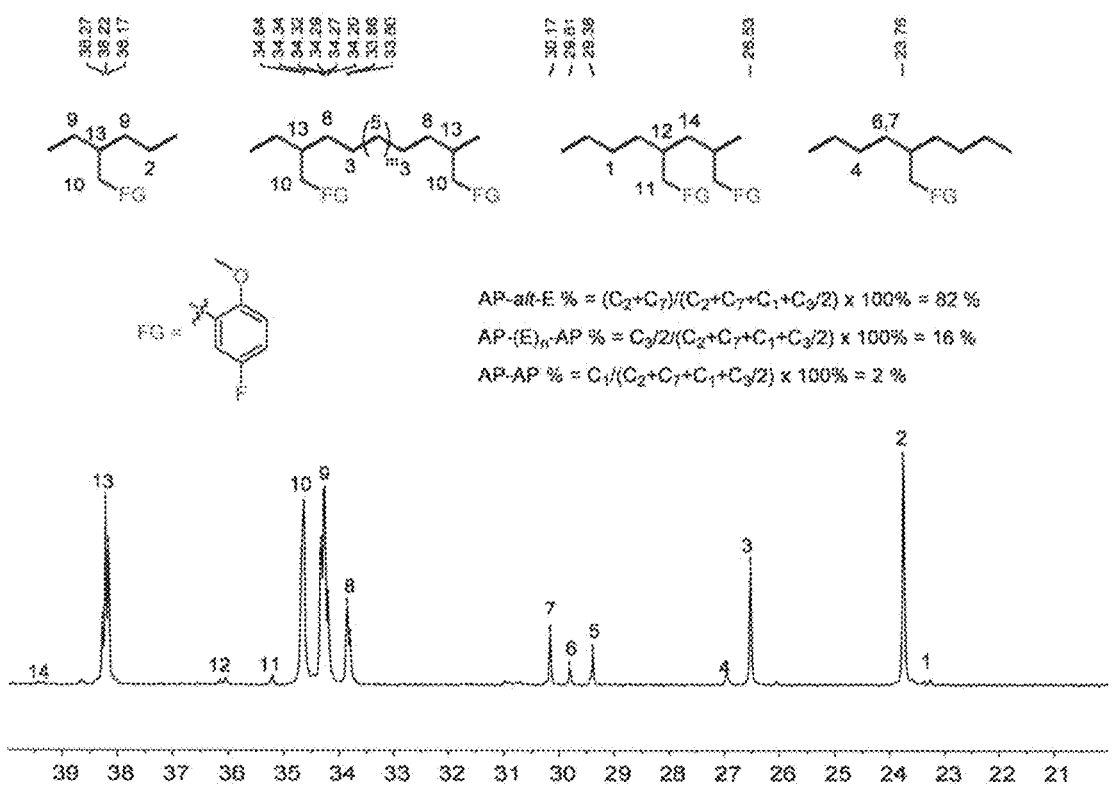
FIG. 15 is a diagram showing the analysis values and a partial enlarged view of a $^{13}$C NMR spectrum of the polymer P7 obtained in Run 7 of Table 3.
Figure 16:
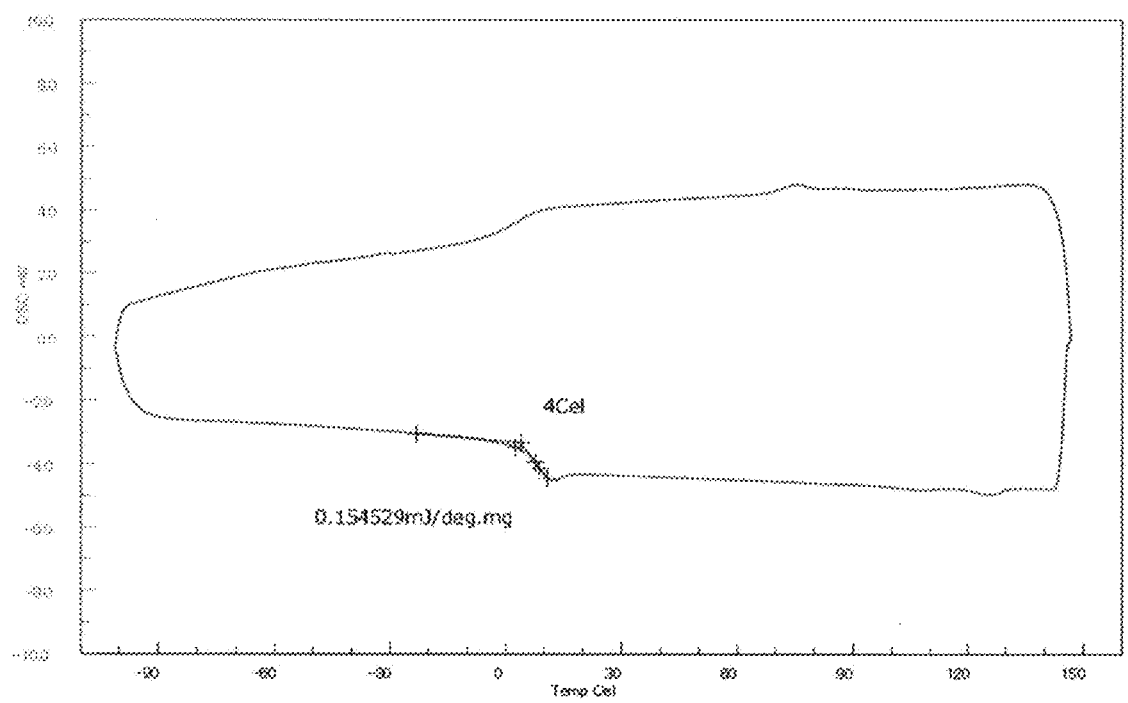
FIG. 16 is a diagram showing a DSC curve of the polymer P7 obtained in Run 7 of Table 3.
Figure 17:
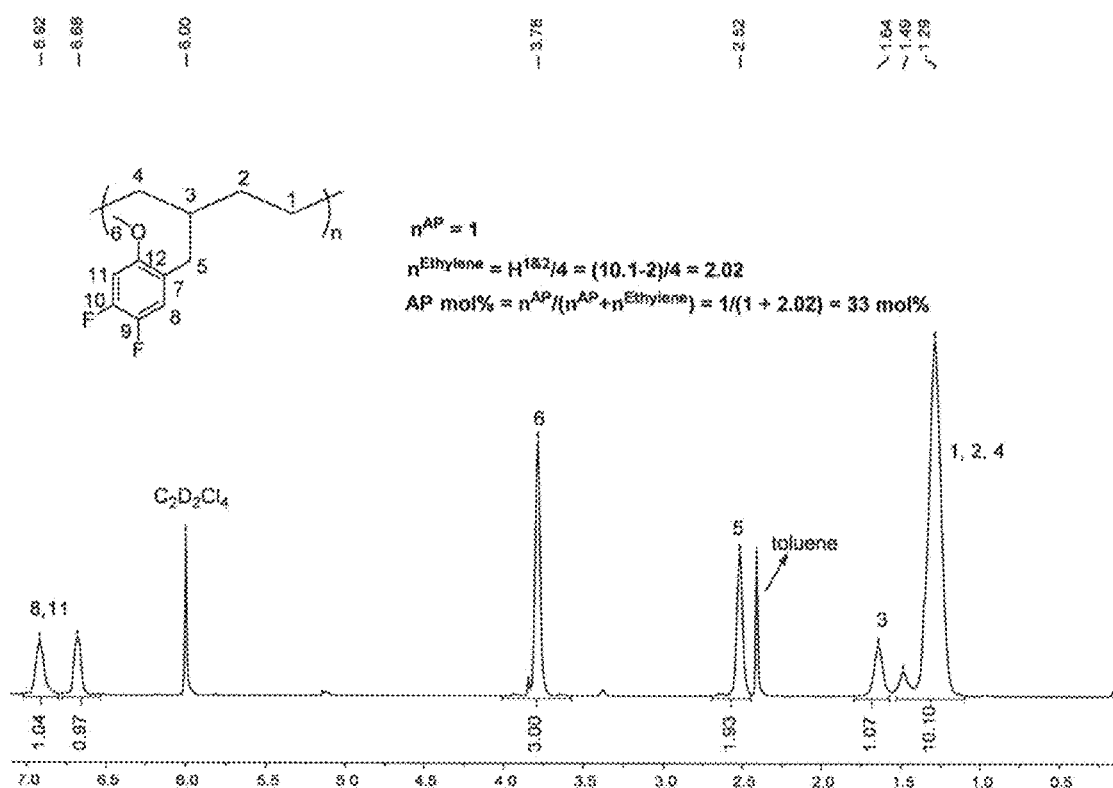
FIG. 17 is a diagram showing the analysis values and a $^1$H NMR spectrum of the polymer obtained in Run 9 of Table 3.
Figure 18:
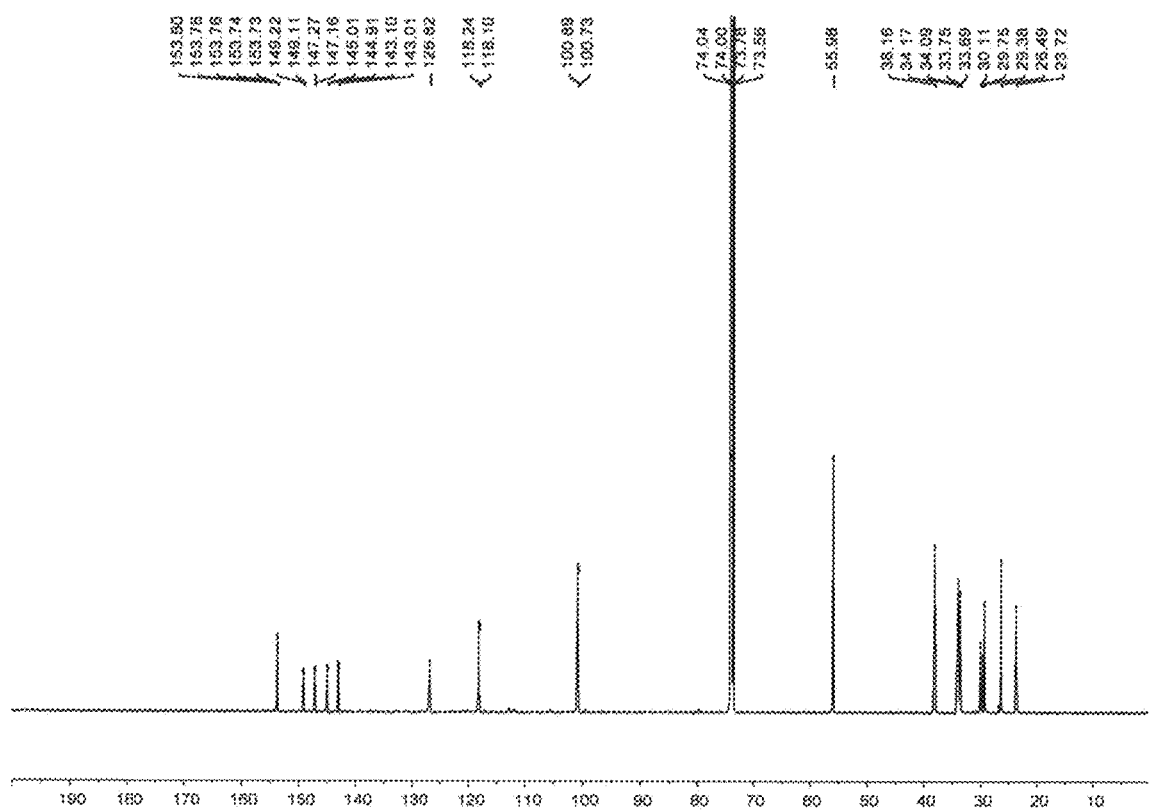
FIG. 18 is a diagram showing a $^{13}$C NMR spectrum of the polymer obtained in Run 9 of Table 3.
Figure 19:
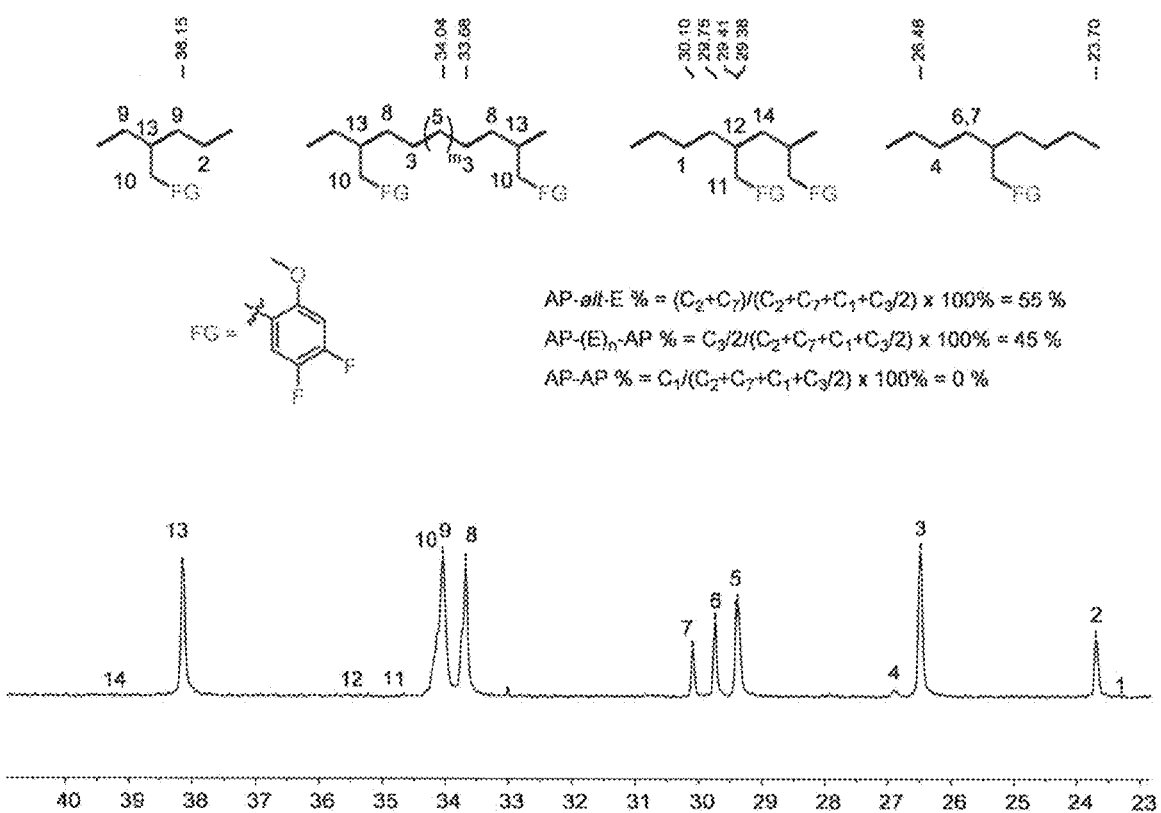
FIG. 19 is a diagram showing the analysis values and a partial enlarged view of a $^{13}$C NMR spectrum of the polymer obtained in Run 9 of Table 3.
Figure 20:
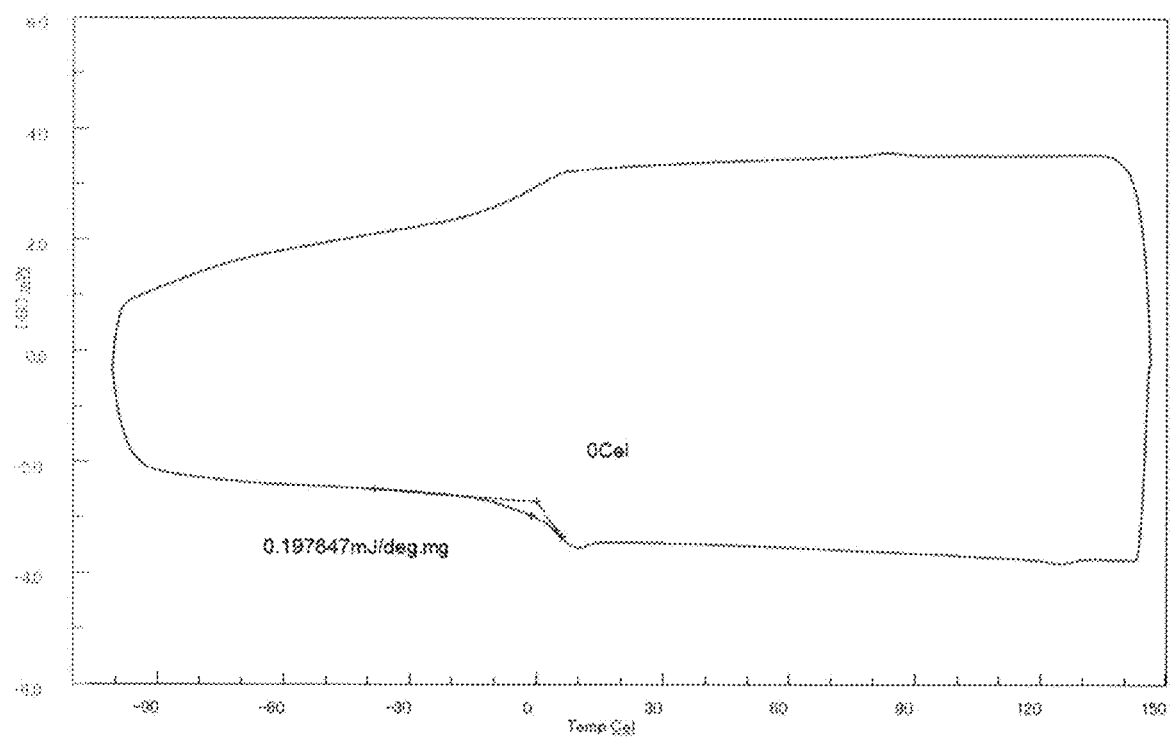
FIG. 20 is a diagram showing a DSC curve of the polymer obtained in Run 9 of Table 3.
Figure 21:
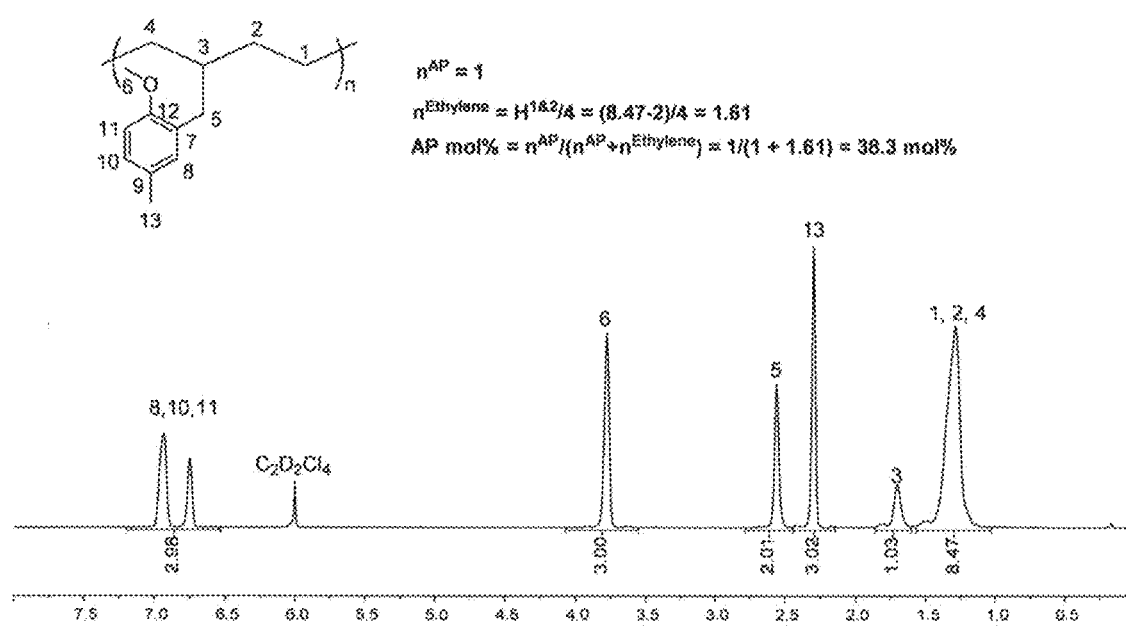
FIG. 21 is a diagram showing the analysis values and a $^1$H NMR spectrum of the polymer P8 obtained in Run 11 of Table 3.
Figure 22:
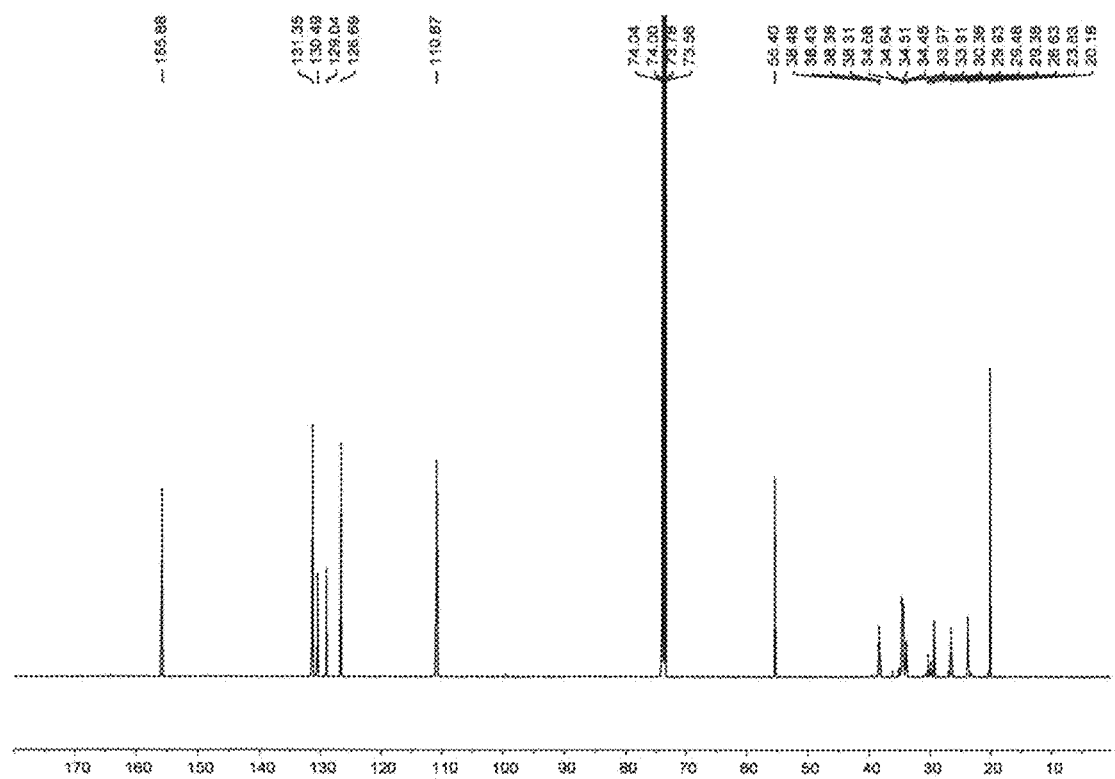
FIG. 22 is a diagram showing a $^{13}$C NMR spectrum of the polymer P8 obtained in Run 11 of Table 3.
Figure 23:
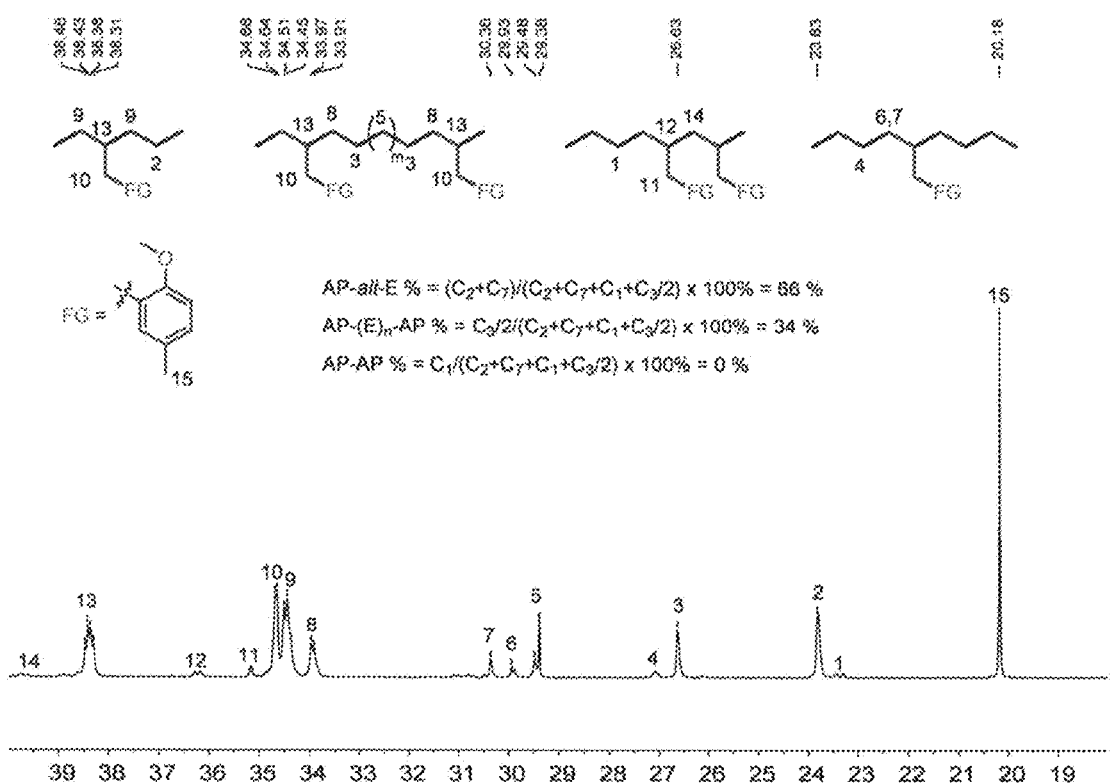
FIG. 23 is a diagram showing the analysis values and a partial enlarged view of a $^{13}$C NMR spectrum of the polymer P8 obtained in Run 11 of Table 3.
Figure 24:
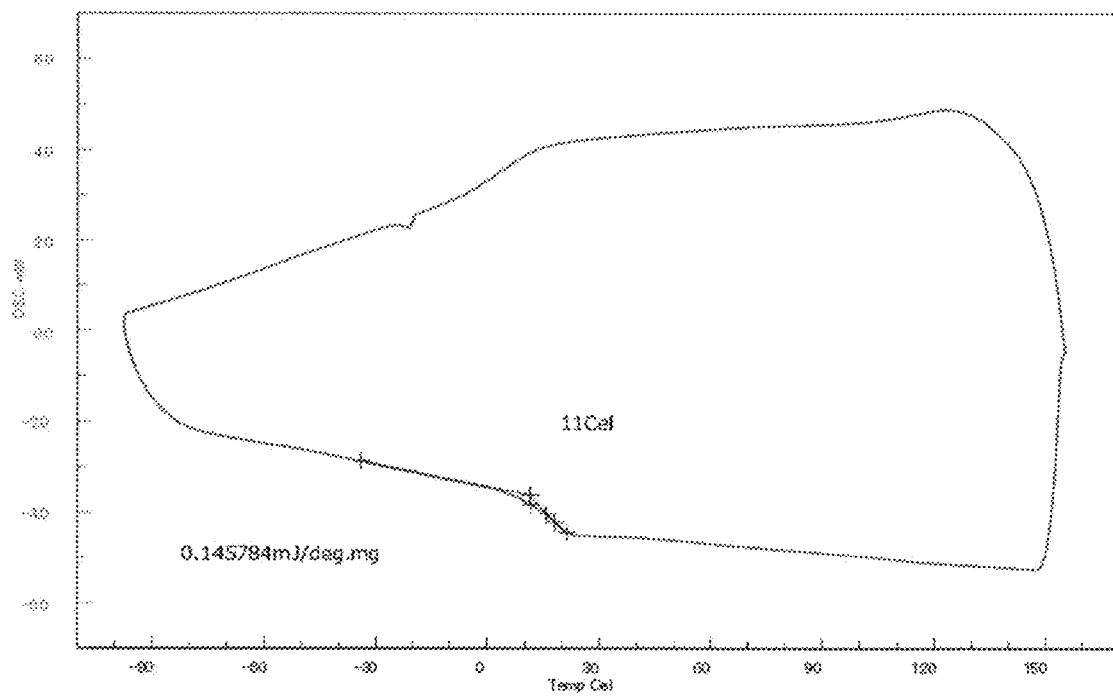
FIG. 24 is a diagram showing a DSC curve of the polymer P8 obtained in Run 11 of Table 3.
Figure 25:
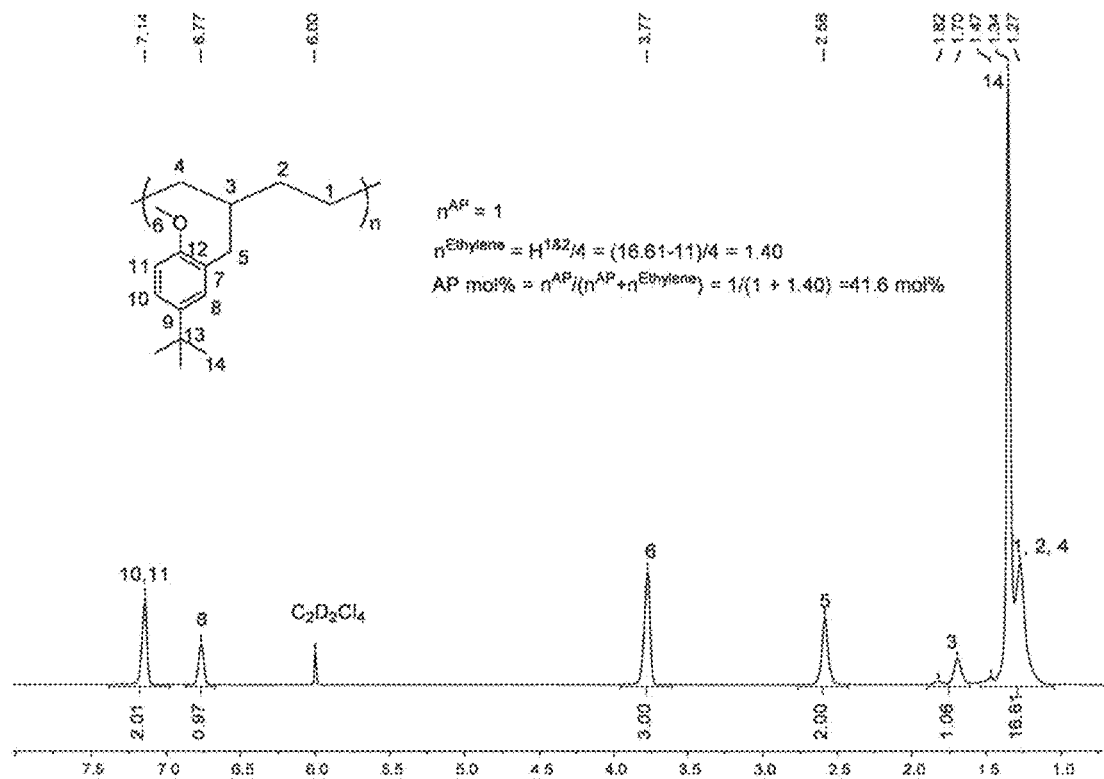
FIG. 25 is a diagram showing the analysis values and a $^1$H NMR spectrum of the polymer P9 obtained in Run 13 of Table 3.
Figure 26:
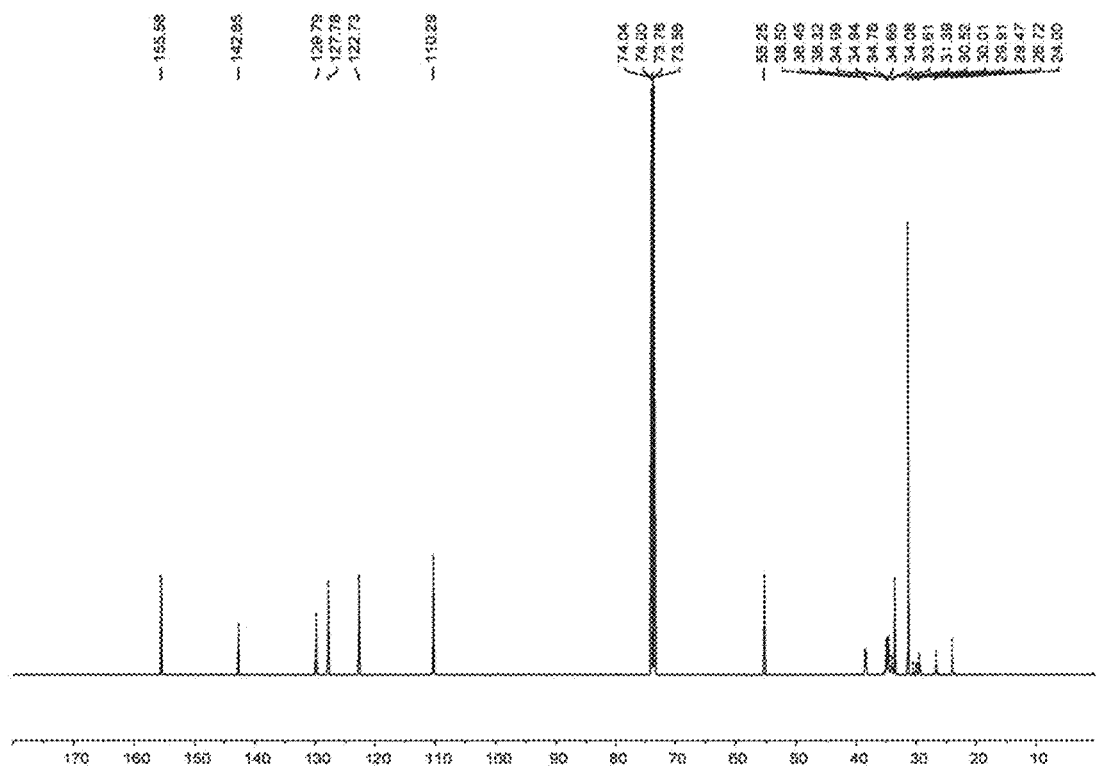
FIG. 26 is a diagram showing a $^{13}$C NMR spectrum of the polymer P9 obtained in Run 13 of Table 3.
Figure 27:
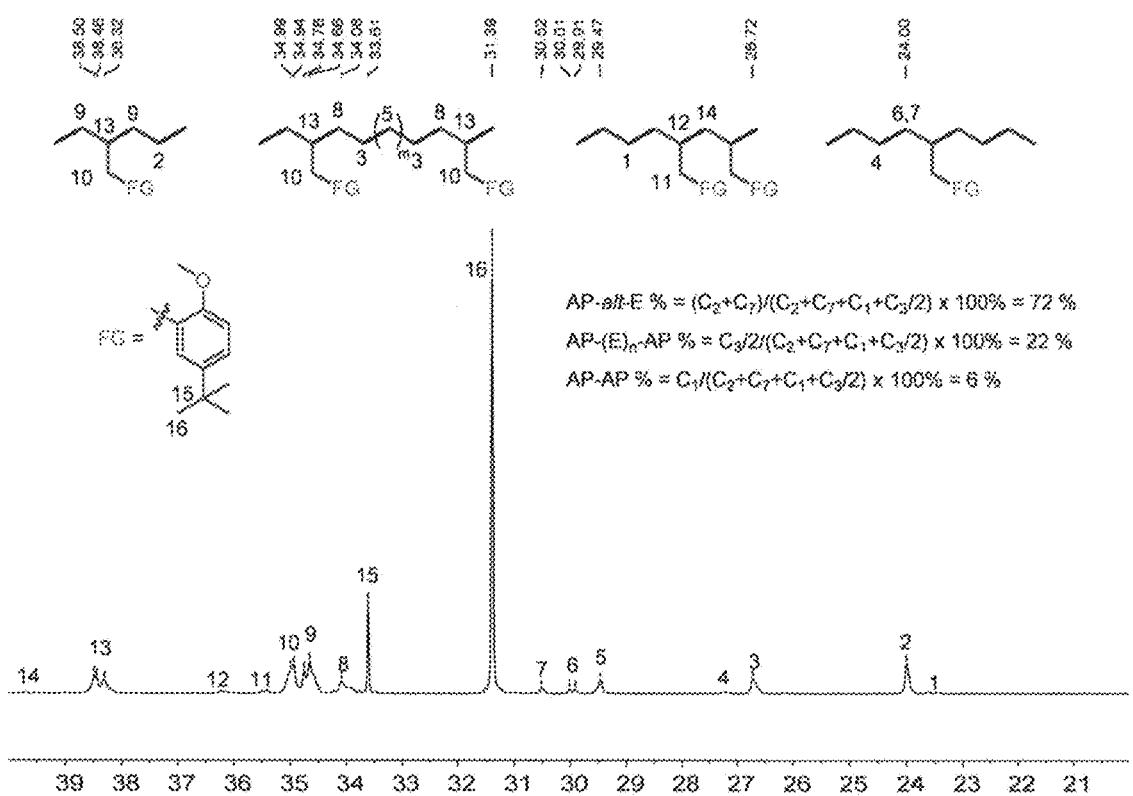
FIG. 27 is a diagram showing the analysis values and a partial enlarged view of a $^{13}$C NMR spectrum of the polymer P9 obtained in Run 13 of Table 3.
Figure 28:
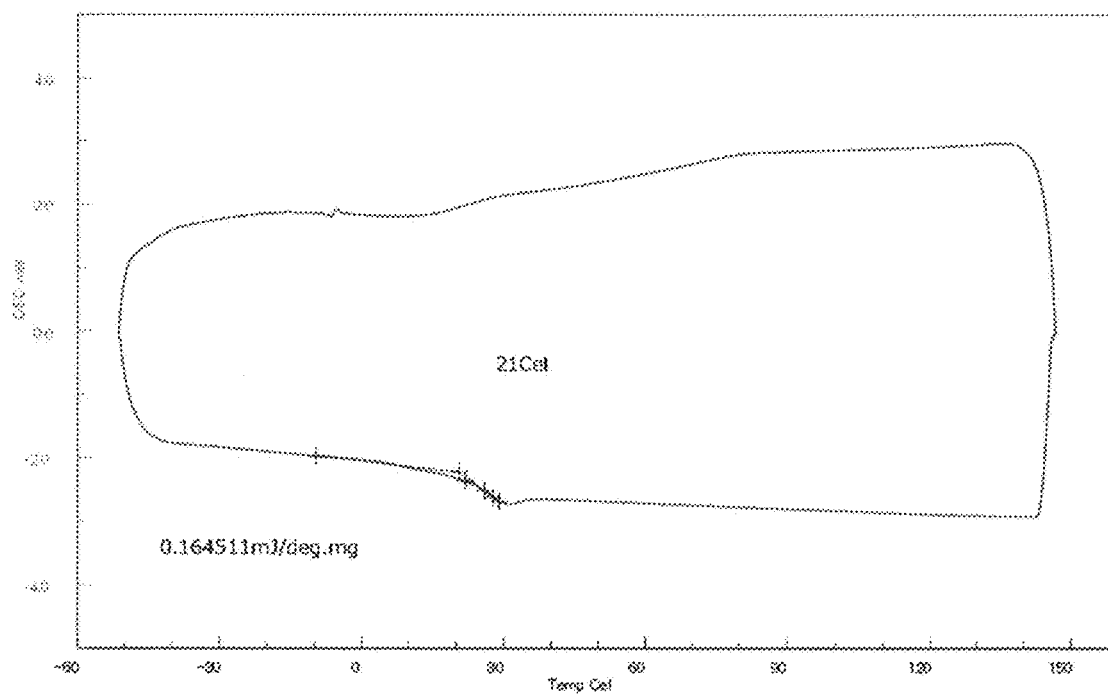
FIG. 28 is a diagram showing a DSC curve of the polymer P9 obtained in Run 13 of Table 3.
Figure 29:
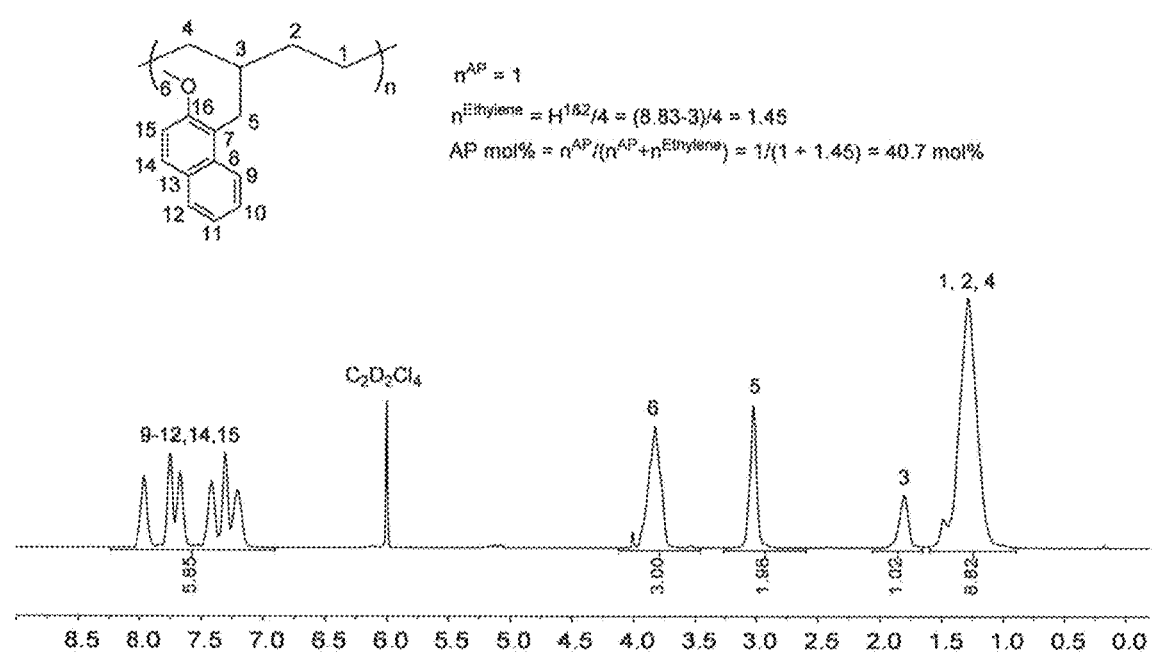
FIG. 29 is a diagram showing the analysis values and a $^1$H NMR spectrum of the polymer P10 obtained in Run 15 of Table 3.
Figure 30:
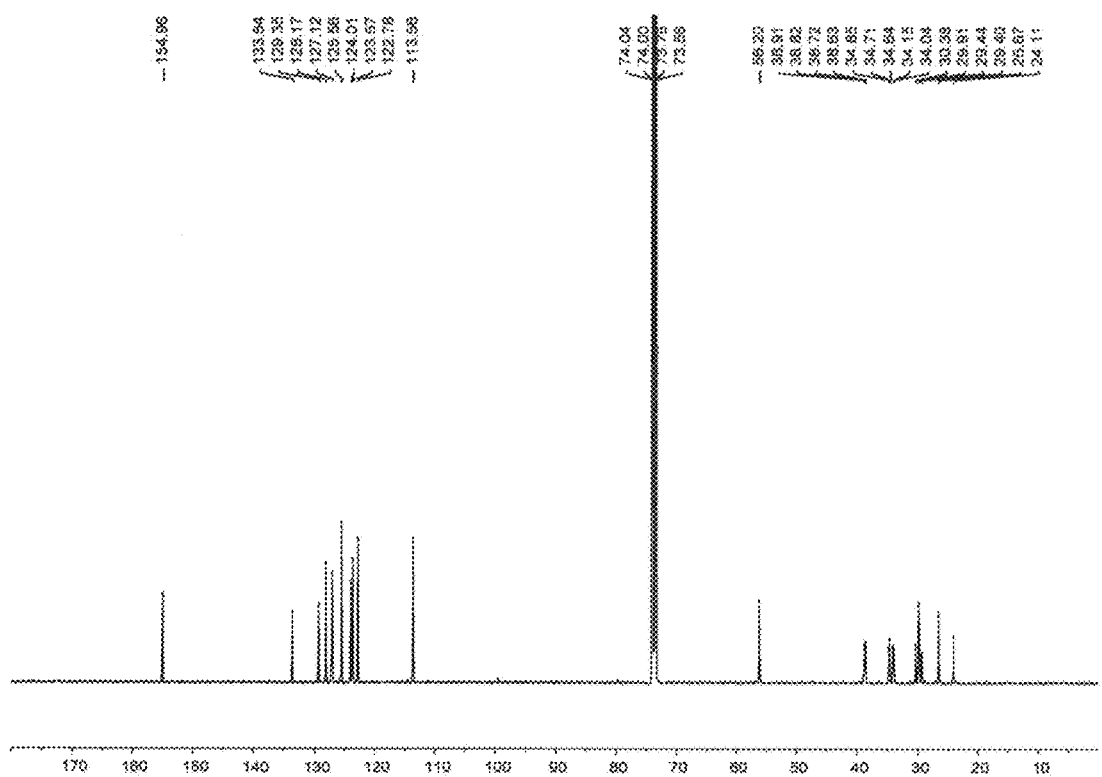
FIG. 30 is a diagram showing a $^{13}$C NMR spectrum of the polymer P10 obtained in Run 15 of Table 3.
Figure 31:
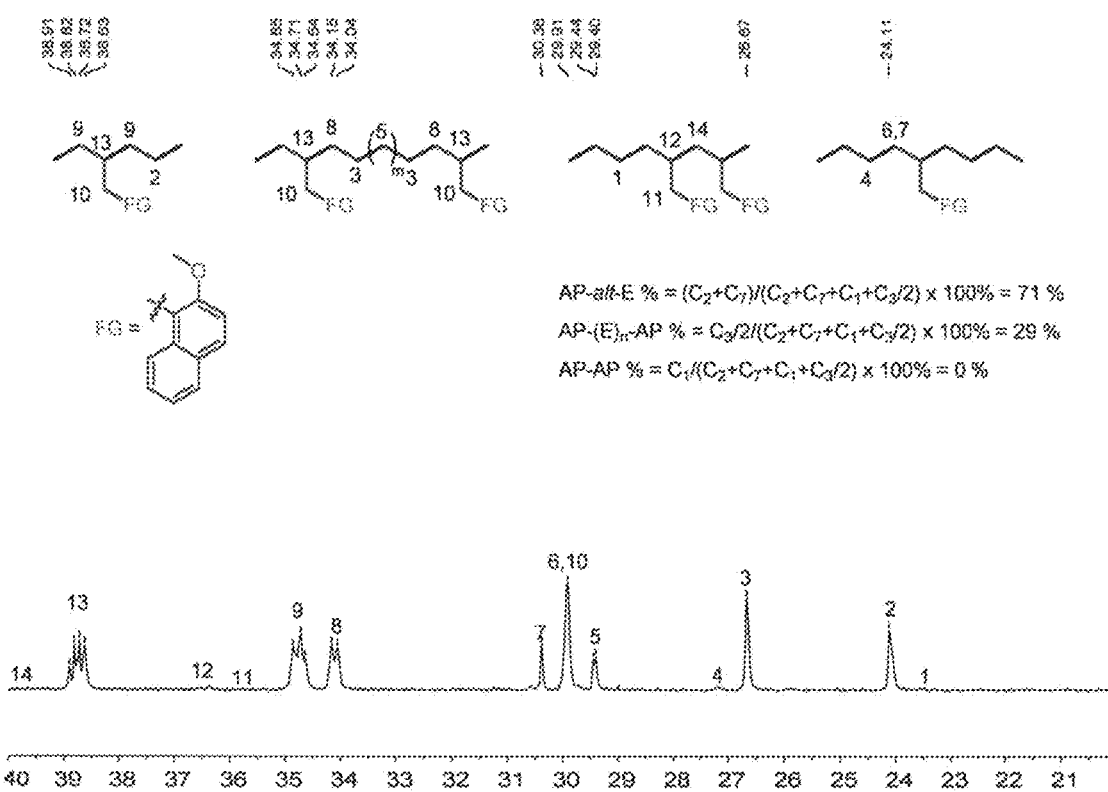
FIG. 31 is a diagram showing the analysis values and a partial enlarged view of a $^{13}$C NMR spectrum of the polymer P10 obtained in Run 15 of Table 3.
Figure 32:
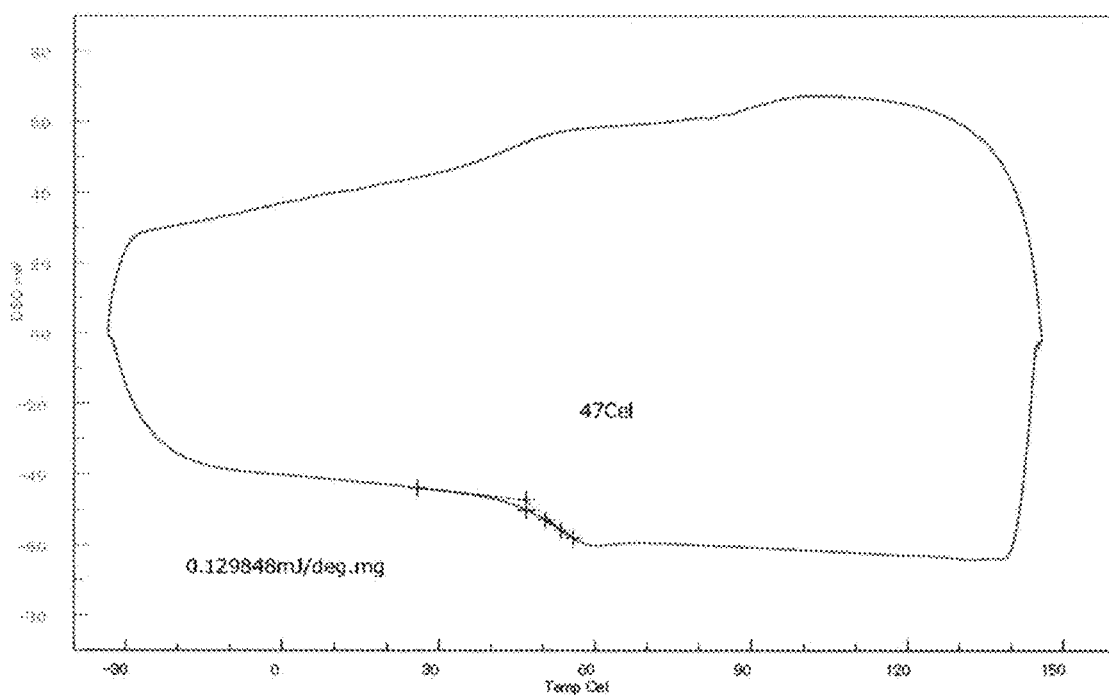
FIG. 32 is a diagram showing a DSC curve of the polymer P10 obtained in Run 15 of Table 3.

The E-AP copolymers P1 to P5 could be processed into a colorless and highly transparent film with a maximum transparency of 85% in the visible region by melt pressing (FIG. 7). The molecular weight of each copolymer significantly affected the mechanical properties (Table 2 and A of FIG. 8). The copolymer P1 had a relatively small number average molecular weight, exhibited stress softening after 600% elongation at a speed of 200 mm·min$^{-1}$, and soft viscoelastic behavior (A of FIG. 8). In contrast, the static stress-strain curves of longer-chain copolymers P2 to P5 exhibited typical characteristics of a thermoplastic elastomer (Table 2 and A of FIG. 8). The tensile strength increased as the molecular weight increased, and with respect to P5, the tensile strength of 10.2 MPa and the strain of >2000% were reached. With respect to P2 to P5, the toughness values respectively reached from 31.4 to 68.2 MJm$^{-3}$, which has been conceivably the highest value ever among the polymers having a self-healing ability at room temperature. The tensile strength, Young's module, and elastic strain recovery of the copolymer increased with the molecular weight (Table 2). In the stress-strain test of 1000% elongation, the copolymer P5 gave a residual strain of 6% in the first cycle and a residual strain of 9% in the tenth cycle to demonstrate excellent fatigue resistance (B of FIG. 8). A sample of the copolymer P5 was subjected to a cycle of elongation of 1000% and release, and then allowed to rest for 3 hours to obtain a completely recovered stress-strain curve (C of FIG. 8).

TABLE 2

| Copolymer | Mn (10$^3$ g mol$^{-1}$) | Initial elastic modulus (MPa) | Elongation at break (%) | Stress recovery (10 Cycles; %) | Tensile strength (MPa) | Toughness (MJ/m$^3$) |
|---|---|---|---|---|---|---|
| P1 | 41 | 3.6 ± 0.1 | >3200 | — | 0.16 ± 0.01 | — |
| P2 | 90 | 2.8 ± 0.5 | 2164 ± 104 | 52 | 3.1 ± 0.3 | 31.4 ± 2.9 |
| P3 | 173 | 5.9 ± 0.6 | 2228 ± 76 | 78 | 4.6 ± 0.6 | 44.5 ± 8.8 |
| P4 | 344 | 9.1 ± 0.7 | 2205 ± 44 | 86 | 6.8 ± 0.5 | 54.6 ± 6.5 |
| P5 | 552 | 13.5 ± 0.3 | 2054 ± 185 | 91 | 10.2 ± 0.6 | 68.2 ± 11 |

[Example 3] Copolymerization of AP$^R$ and Ethylene

A substituted 2-allylanisole was synthesized according to the method described in the following literature.
(1) P. Anbarasan, H. Neumann, and M. Beller, Chem. Eur. J., 17, 4217-4222 (2011).
(2) H. Jiang, W. Yang, H. Chen, J. Li, and W. Wu, Chem. Commun., 50, 7202-7204 (2014).

A polymerization reaction was performed in the same manner as in Example 1 by changing the monomer, the complex, the ratio of the monomer to the catalyst, the reaction time, etc. as shown in Table 3. The measurement results of the physical properties of the obtained polymers are shown in Table 3 and FIGS. 9 to 32.

Using AP$^R$ as a monomer, an alternating ethylene-substituted 2-allylanisole (E-AP$^R$) copolymer product was obtained. Using 2000 equivalents or 5000 equivalents of anisylpropylene, high molecular weight copolymers P6 to P11 were obtained. The copolymers P6 to P11 showed a wide range of glass transition temperatures depending on various substitution components of the anisyl moiety. It was confirmed that the yield and the molecular weight were enhanced by increasing the ratio of the monomer to complex and the reaction time. Further, it was revealed by a $^{13}C\{^1H\}$ NMR analysis that the copolymers (P6 to P11) had mainly alternating $AP^R$-E sequences (about 57 to 78%), and some $AP^R$-$(E)_n$—$P^R$ sequences (n≥2, about 20 to 43%) and E-$AP^R$-$AP^R$-E sequences (0 to 4%) similarly to P5. In the following formulas, each copolymer is schematically expressed only by an alternating $AP^R$-E sequence, which is the main sequence.

TABLE 3
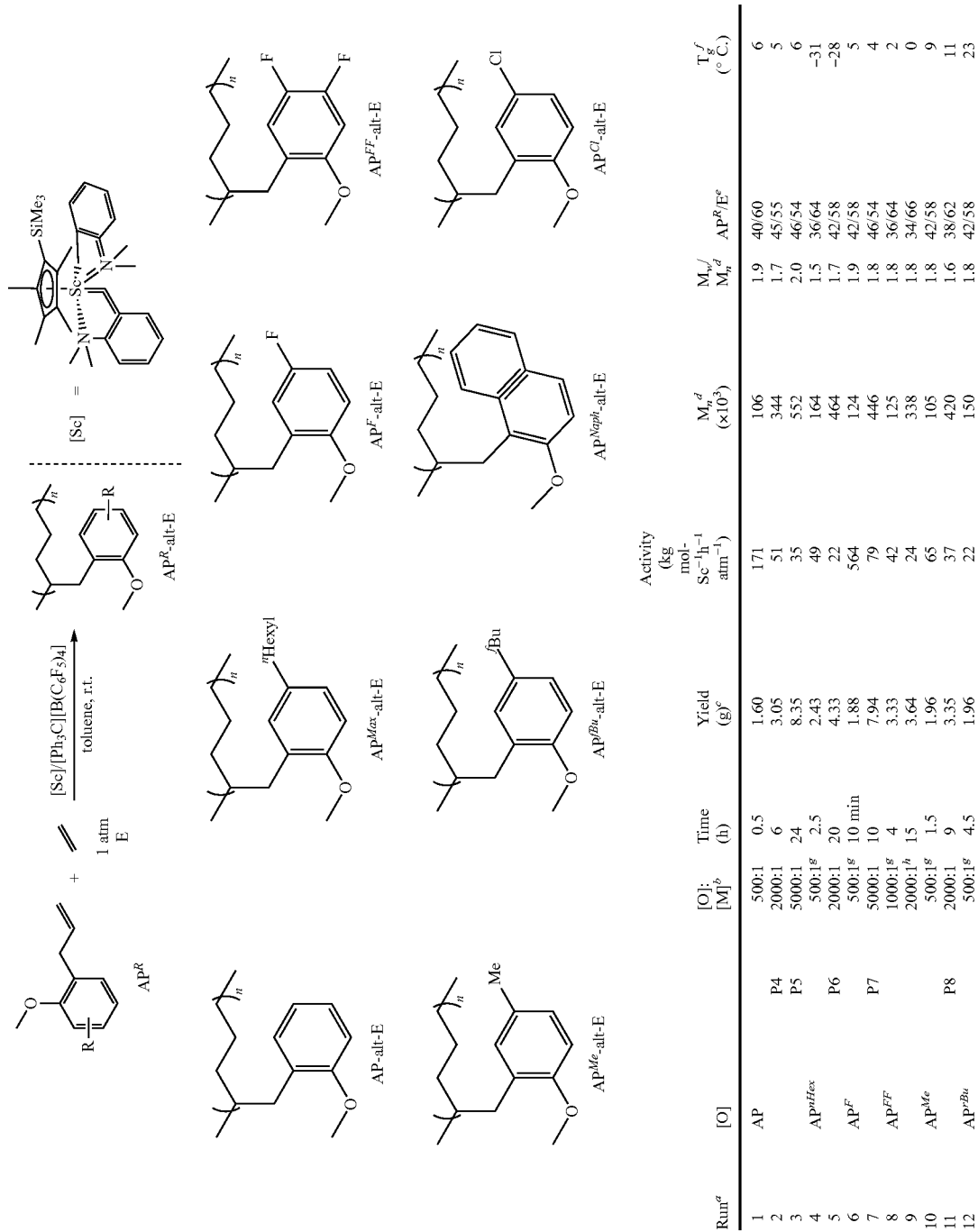
| Run[a] | [O] | [O]:[M][b] | Time (h) | Yield (g)[c] | Activity (kg mol-Sc⁻¹ h⁻¹ atm⁻¹) | $M_n^d$ (×10³) | $M_w/M_n^d$ | $AP^R/E^e$ | $T_g^f$ (°C) |
|---|---|---|---|---|---|---|---|---|---|
| 1 | AP | 500:1 | 0.5 | 1.60 | 171 | 106 | 1.9 | 40/60 | 6 |
| 2 | | 2000:1 | 6 | 3.05 | 51 | 344 | 1.7 | 45/55 | 5 |
| 3 | | 5000:1 | 24 | 8.35 | 35 | 552 | 2.0 | 46/54 | 6 |
| 4 | AP$^{nHex}$ | 500:1[g] | 2.5 | 2.43 | 49 | 164 | 1.5 | 36/64 | −31 |
| 5 | | 2000:1 | 20 | 4.33 | 22 | 464 | 1.7 | 42/58 | −28 |
| 6 | AP$^F$ | 500:1[g] | 10 min | 1.88 | 564 | 124 | 1.9 | 42/58 | 5 |
| 7 | | 5000:1 | 10 | 7.94 | 79 | 446 | 1.8 | 46/54 | 4 |
| 8 | AP$^{FF}$ | 1000:1[g] | 4 | 3.33 | 42 | 125 | 1.8 | 36/64 | 2 |
| 9 | | 2000:1[h] | 15 | 3.64 | 24 | 338 | 1.8 | 34/66 | 0 |
| 10 | AP$^{Me}$ | 500:1[g] | 1.5 | 1.96 | 65 | 105 | 1.8 | 42/58 | 9 |
| 11 | | 2000:1 | 9 | 3.35 | 37 | 420 | 1.6 | 38/62 | 11 |
| 12 | AP$^{tBu}$ | 500:1[g] | 4.5 | 1.96 | 22 | 150 | 1.8 | 42/58 | 23 |

TABLE 3-continued

| Run[a] | [O] | | [O]:[M][b] | Time (h) | Yield (g)[c] | Activity (kg mol-Sc⁻¹ h⁻¹ atm⁻¹) | $M_n$[d] (×10³) | $M_w/M_n$[d] | AP$^R$/E[e] | $T_g$[f] (°C) |
|---|---|---|---|---|---|---|---|---|---|---|
| 13 | | P9 | 2000:1 | 48 | 4.11 | 8 | 424 | 1.7 | 40/60 | 21 |
| 14 | AP$^{Naph}$ | P10 | 500:1[g] | 2 | 2.00 | 50 | 115 | 2.0 | 41/59 | 52 |
| 15 | | | 2000:1 | 16 | 3.85 | 24 | 259 | 1.8 | 41/59 | 47 |
| 16 | AP$^{Cl}$ | | 500:1[g] | 15 min | 2.20 | 44 | 202 | 2.1 | 38/42 | 18 |
| 17 | | P11 | 2000:1 | 1.1 | 3.89 | 35 | 424 | 2.0 | 39/61 | 18 |

[a]Condition: [M] (0.01 mmol), [Ph₃C][B(C₆F₅)₄] (B) (0.01 mmol), ethylene (1 atm), 150 mL toluene, 20° C. (unless otherwise specified)
[b]Feed ratio (mole) of APR to scandium complex
[c]Polymer product weight (g)
[d]Determined by GPC in 140° C. o-dichlorobenzene with reference to polystyrene standards: Mn = number average molecular weight, Mw = weight average molecular weight
[e]The molar ratio of APR to E in the copolymer was determined by H NMR analysis.
[f]Determined by DSC
[g][M] = [B] = 0.02 mmol, 50 mL toluene
[h][M] = [B] = 0.01 mmol, 50 mL toluene

[Example 4] Physical Properties of E-AP$^R$ Copolymers (P6 to P11)

Films were prepared using copolymers P6 to P11. The measurement results of the physical properties of the prepared films are shown in Table 4 and FIGS. 33 to 35.

Figure 33:
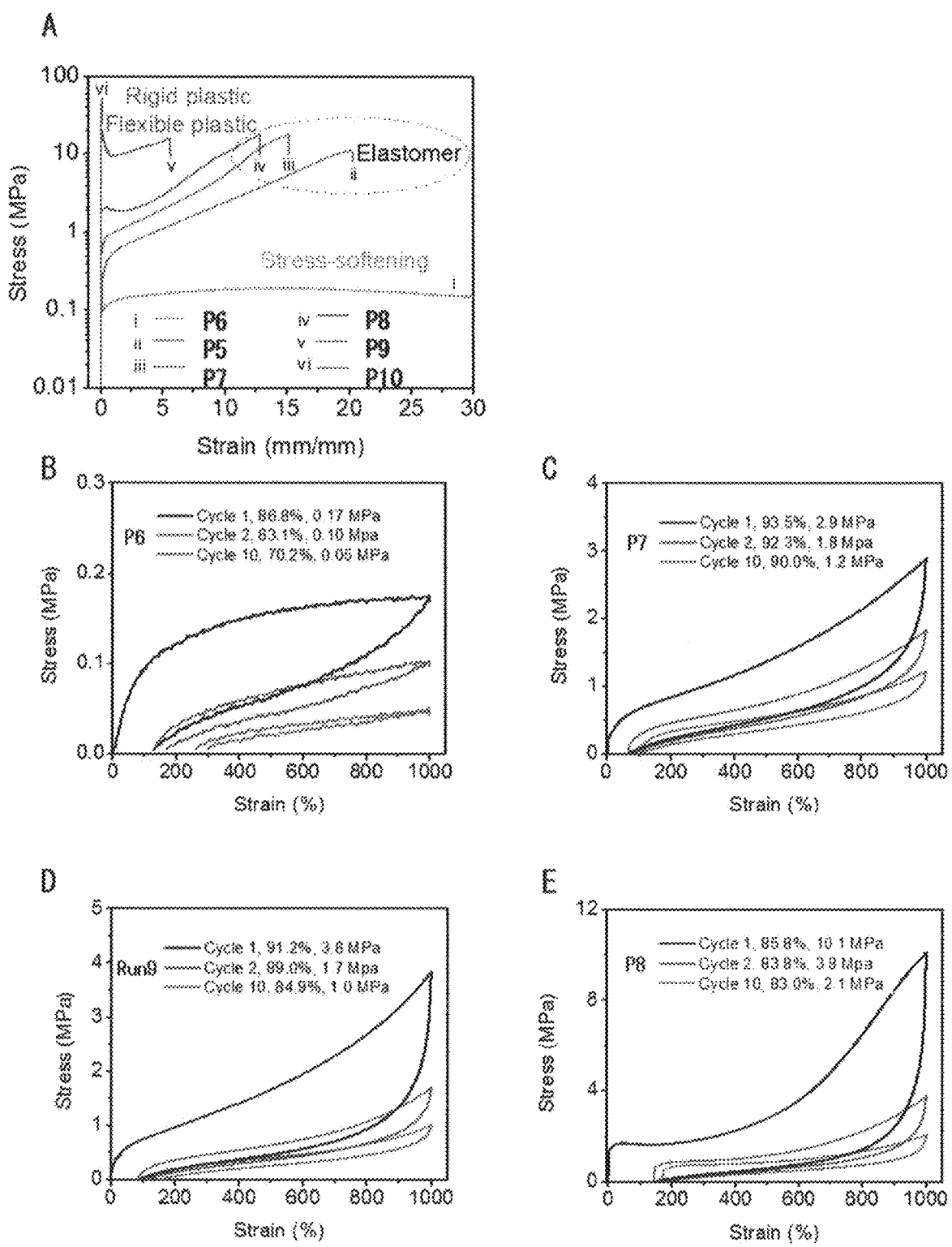
FIG. 33 is diagrams showing the mechanical properties concerning the copolymers P6 to P10. A of FIG. 33 is stress-strain curves of the copolymers P6 to P10 at a testing rate of 200 mm·min$^{-1}$. B of FIG. 33 is tensile strength/hysteresis curves of the copolymer P6. Ten cycles of 1000% elongation were performed. C of FIG. 33 is tensile strength/hysteresis curves of the copolymer P7. D of FIG. 33 is tensile strength/hysteresis curves of the copolymer of Run 9 in Table 3. E of FIG. 33 is tensile strength/hysteresis curves of the copolymer P8.

The films of the copolymers P6 to P11 showed various mechanical properties because the range of Tg among the copolymers P6 to P10 was broad (A of FIG. 33). The n-Hexyl-substituted copolymer P6 was a stress softening material and was able to stretch up to 10000% without breaking. A fluoro-substituted copolymer P7 and a methyl-substituted copolymer P8 are typical elastomers. P7 and P8 showed significantly higher initial elastic modulus and tensile strength compared to P1 to P5 (Table 2, 4, A of FIG. 33). The elongation at break of P7 or P8 is lower than P5 (Table 4), but these two elastomers have a toughness higher than P5 to demonstrate that P7 and P8 are endowed with both rigidity and toughness. In contrast, the t-butyl-substituted copolymer P9 is a flexible plastic, which showed ductility and strain hardening when it was drawn at room temperature and a tension rate of 200 mm·min$^{-1}$ (Table 4). The naphthyl copolymer P10 is a rigid plastic at room temperature. P10 showed a remarkable reduction in strain at break (7 to 9%), a high tensile stress (50 MPa or more), and an extraordinary high initial elastic modulus (1000 MPa or more). This is because it is vitrified at room temperature (Tg=49 to 53° C.). The chloro-substituted copolymer P11 (Tg=18° C.) was a flexible plastic, and showed a high initial elastic modulus (218 MPa or more), a medium elongation at break (954%), a high tensile strength (22.7 MPa), and a toughness of 117 MJm$^{-3}$.

Figure 34:
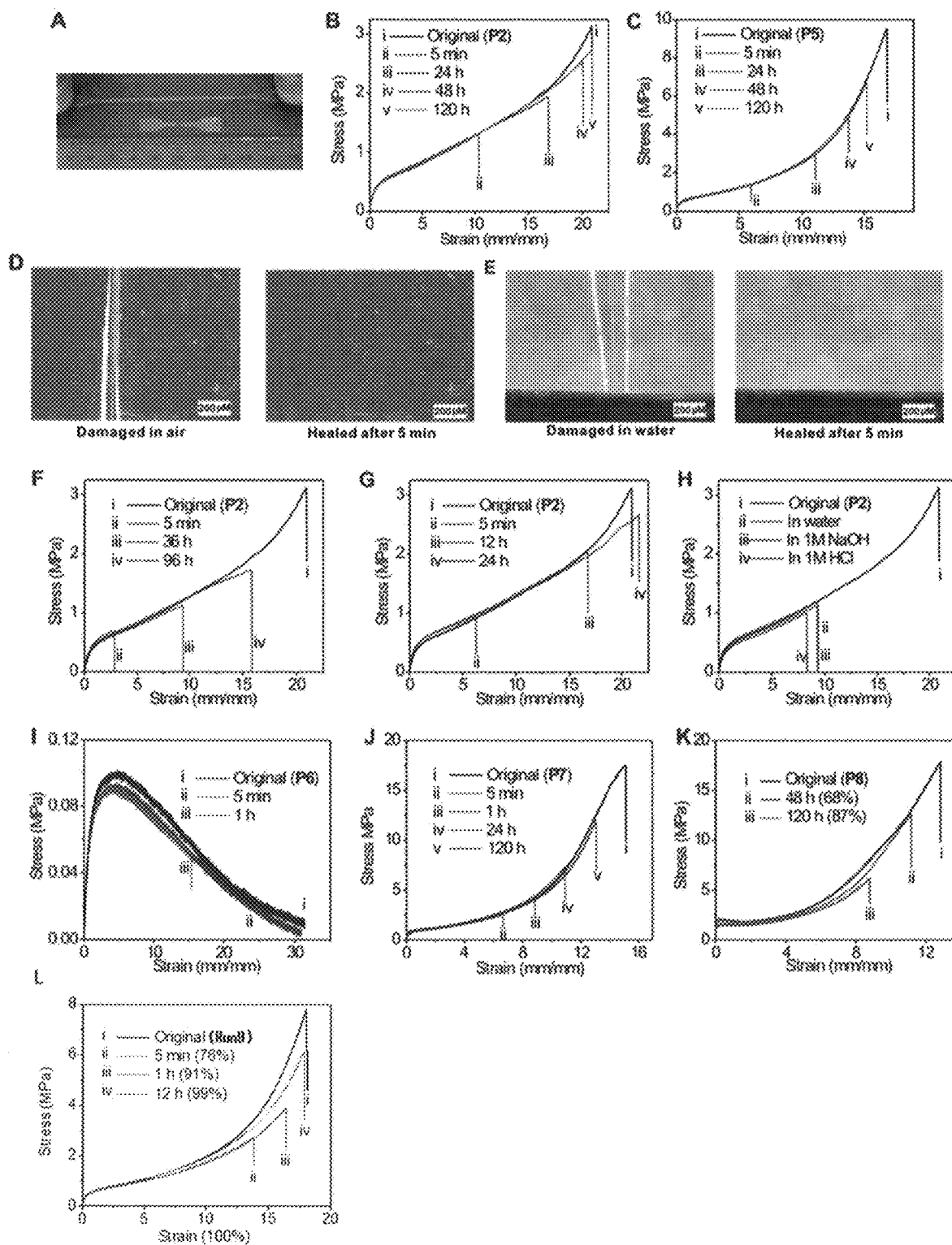
FIG. 34 is diagrams showing the self-healing ability of an alternating AP-E copolymer film. A of FIG. 34 is optical images (photos) of a film sample of the copolymer P2 in a fractured state (bottom), and in a stretched state (top) after healing at 25° C. for 5 min. A fractured sample was prepared by completely cutting a film into two separate pieces using a razor blade. A healed sample was prepared by jointing the cut surfaces together, lightly pressing them for 15 sec, and then allowing them to heal in air at 25° C. for 5 min. B of FIG. 34 is stress-strain curves showing the test results of self-healing ability of the copolymer P2 in air at 25° C. C of FIG. 34 is stress-strain curves showing the test results of self-healing ability of the copolymer P5 in air at 25° C. D of FIG. 34 is optical microscope observation images (photos) of a sample of the copolymer P5 damaged in air at 25° C. (left) and then healed (right). The film of the copolymer P5 was nicked with a razor blade and allowed to recover in air for 5 min. E of FIG. 34 is optical microscope observation images (photos) of a sample of the copolymer P2 damaged in water at 25° C. (left) and then healed (right). The film of the copolymer P2 was nicked with a razor blade and allowed to recover in water for 5 min. F of FIG. 34 is stress-strain curves showing the test results of the self-healing ability of the copolymer P2 in water at 25° C. G of FIG. 34 is stress-strain curves showing the test results of the self-healing ability of the copolymer P2 in water at 37° C. H of FIG. 34 is stress-strain curves showing comparative test results of the self-healing ability of the copolymer P2 (ii) in water, (iii) in 1 M-HCl, and (iv) in 1 M-NaOH at 25° C., for 36 hours. I of FIG. 34 is stress-strain curves showing the test results of the self-healing ability of the copolymer P6 in air at 25° C. J of FIG. 34 is stress-strain curves showing the test results of the self-healing ability of the copolymer P7 in air at 25° C. K of FIG. 34 is stress-strain curves showing the test results of the self-healing ability of the copolymer P8 in air at 25° C. L of FIG. 34 is stress-strain curves showing the test results of the self-healing ability of the copolymer of Run 9 in Table 3 in air at 25° C.

E-AP(AP$^R$) copolymers showed excellent self-healing characteristics in addition to excellent elasticity (FIG. 34). When the damaged surfaces of P2 film sample were jointed together at room temperature, the two damaged parts were rapidly healed (A of FIG. 34). After only 5 min, the healed sample could be stretched up to 1000% (50% of the original value) (B of FIG. 34, ii). As the healing time became longer, the healed condition became better. After 120 hours, the damaged parts were completely healed (B of FIG. 34, v). This is verified by causing a fracture at another site (a site different from the healed site), and additionally observing an elongation corresponding to the elongation of the sample at the initial stage. The stress-strain curve of the healed sample nearly overlapped the stress-strain curve of the material at the initial stage. In most cases, only the difference was elongation at break (B and C of FIG. 34). P5 that is a polymer having a higher molecular weight required a longer healing time, and recovered to 90% of the original elongation after 120 hours at room temperature (C of FIG. 34). The healed sample of P5 showed a tensile strength as high as 6.7 MPa at an elongation of 1520% (C of FIG. 34, v).

A film of P5 was cut with a razor blade to make a nick and then left standing in air at 25° C. After 5 min, a damage was visually not recognizable (see D of FIG. 34). Amazingly, this rapid self-healing occurred also in water (see E of FIG. 34). The film of P2, which was completely cut in advance and healed in water at 25° C. for 96 hours, could be elongated up to 1670% (about 80% of the original value) (F of FIG. 34, iv). In a case in which a P2 sample was cut and healed in water at 37° C. (human body temperature) for 24 hours, complete healing was observed (G of FIG. 34, iv). Further, for this damaged sample, self-healing was possible even in an acidic solution or a basic solution (1 M HCl, 1 M NaOH, etc.) (H of FIG. 34). The aforedescribed characteristic are extremely contrastive to the existing self-healing materials based on ionic aggregation or hydrogen bonds, which hardly functioned in water under an acidic condition, or a basic condition (Non Patent Literature. 2).

Since P6, which was a stress softening material, and had high adhesiveness, it exhibited high speed self-healing characteristics (I of FIG. 34). Amazingly the fluoro-substituted copolymer P7 and the methyl-substituted copolymer P8 exhibited better healing efficiency at room temperature than P5 (J and K of FIG. 34). When the healing time was 5 days, the recovery rates of elongation at break were 86% and 87% respectively. Further amazingly, the P7 and P8 samples after re-repair showed tensile stresses of 11.9 MPa and 12.6 MPa respectively. These values are the highest among those ever reported for autonomous healing materials, and higher than any existing self-healing materials in the initial stage (Non Patent Literature 2).

Figure 35:
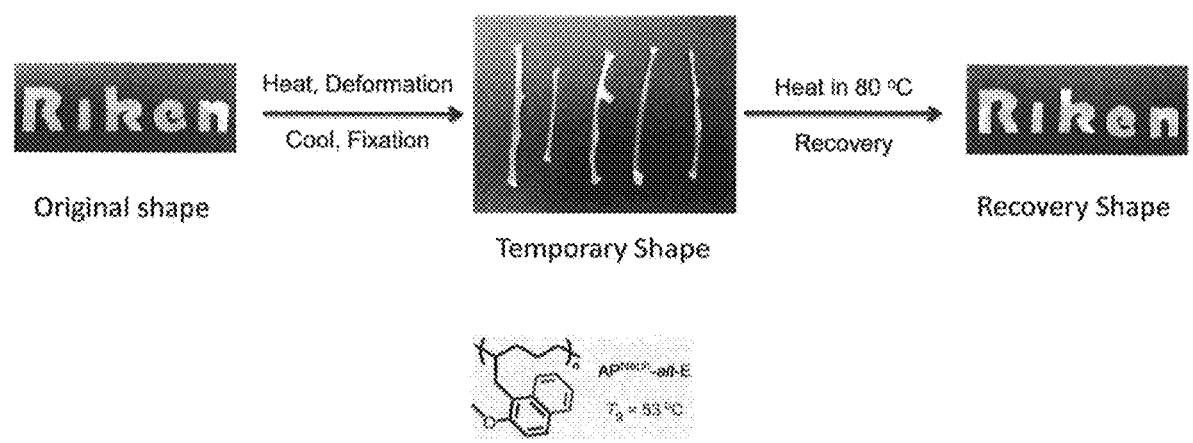
FIG. 35 is diagrams (photos) showing the shape-memory property of the copolymer P10. The left one is the original shape of a molded sample of the copolymer P10. The middle one shows a sample of the molded copolymer P10 stretched in a water bath at 80° C. The shape of the P10 sample was fixed by releasing the force at room temperature. The right one shows a sample of the molded copolymer P10 whose original shape was recovered in a water bath at 80° C. for 2 min.
Figure 39:
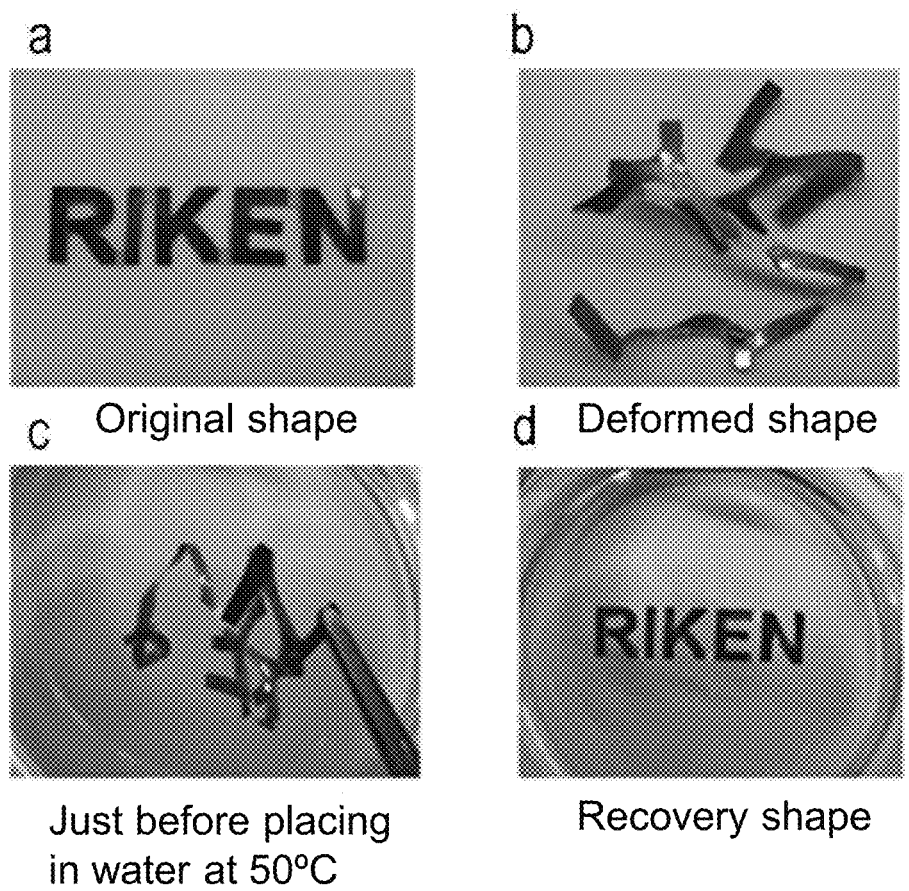
FIG. 39 is diagrams (photos) showing the shape-memory property of a film sample of the copolymer P9 produced in Example. "a" of FIG. 39 shows the original shape of a molded sample of the copolymer P9. "b" of FIG. 39 shows a deformed sample of the molded copolymer P9 stretched at 50° C. "c" of FIG. 39 shows a state in which the sample of b maintains the deformed shape at 20° C. "d" of FIG. 39 shows the sample of the molded copolymer P9 which original shape was recovered in a water bath at 50° C. for 5 sec.

The t-butyl-substituted copolymer P9 was a flexible plastic at room temperature, and the naphthyl copolymer P10 was a rigid plastic at room temperature, but both of them exhibited excellent elastic properties at high temperature (data not shown). Owing to thermally peculiar plasticity and elasticity, there is flexibility in a shaping operation. As shown in FIG. 35, the film sample of P10 having a predetermined shape was stretched to take a deformed shape, when an external force was applied at 80° C. When the sample was cooled to room temperature, the deformed shape was fixed. When the sample was heated again to 80° C. without applying any external force, it was observed that the original shape was almost completely restored. Further, as shown in FIG. 39, the film sample of P9 was stretched to take a deformed shape, when an external force was applied at 50° C. When the sample was cooled to 20° C., the deformed shape was fixed. When this sample was placed in water at 50° C. to be heated without applying any external force, it was observed that the original shape was almost completely restored within 5 sec.

Figure 40:
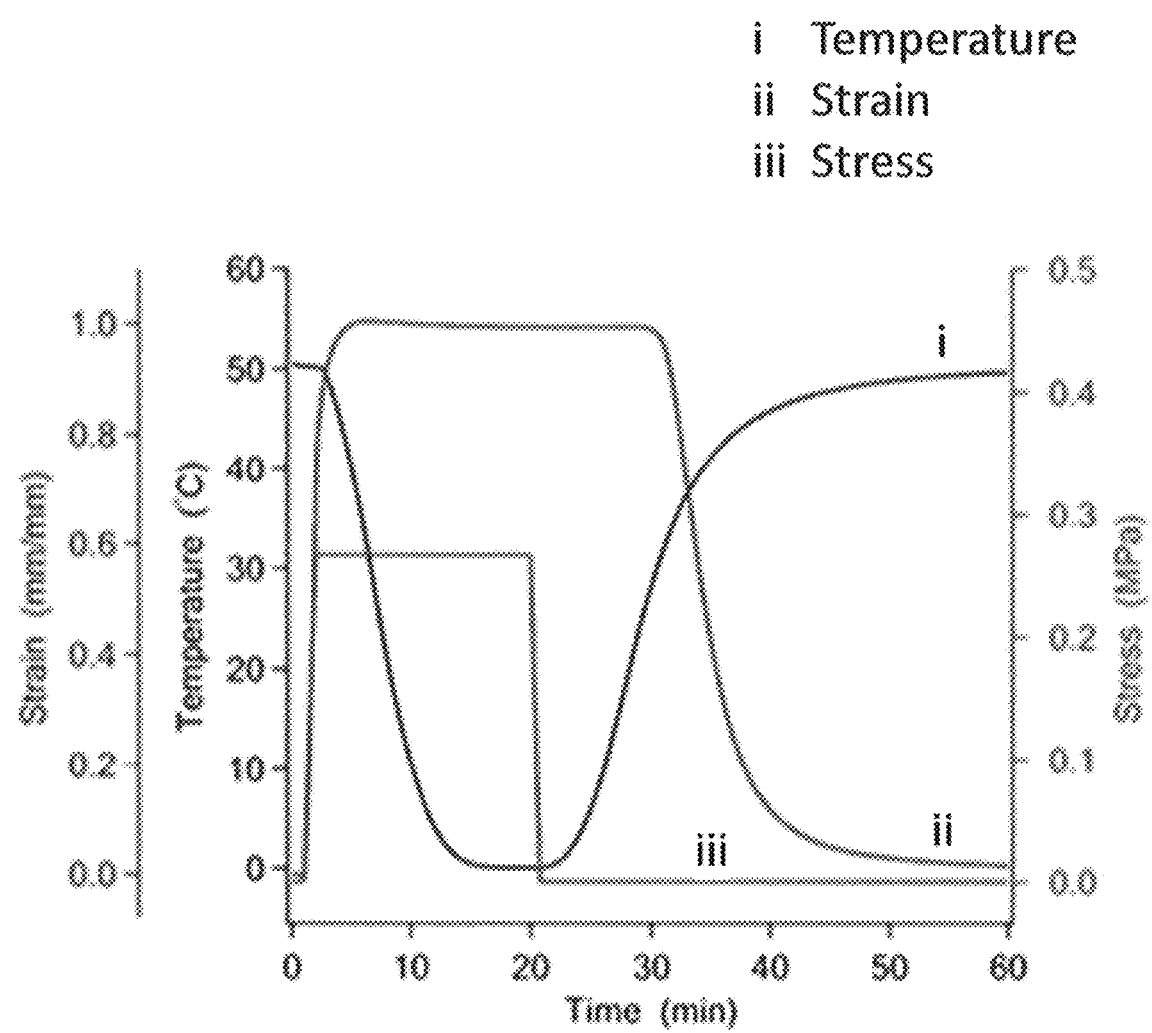
FIG. 40 is a graph showing a dual shape-memory cycle at 50° C. of a film sample of the copolymer P9 produced in Example.

Further, the results of separate measurements of two shape-memory cycles at a temperature of 50° C. (thermomechanical analysis (TMA)) for a P9 film sample are shown in FIG. 40. As obvious from the graph shown in FIG. 40, the film sample of P9 functioned as a shape-memory material by controlling the temperature, and the shape fixed rate and the shape recovery rate were excellently as high as 99%. Such a thermo-responsive material having a controllable shape changing behavior is also a highly desirable material in the real world device application.

TABLE 4

| Copolymer | | Mn (10³ g mol⁻³) | Before use | | | | Self-healing efficiency and Required time (h)[a] | After recovery | | |
|---|---|---|---|---|---|---|---|---|---|---|
| | | | Initial elastic modulus (MPa) | Tensile strength (MPa) | Elongation at break (%) | Toughness (MJ/m³) | | Tensile strength (MPa) | Elongation at break (%) | Toughness (MJ/m³) |
| AP-alt-E | P2 | 90 | 2.8 ± 0.5 | 3.1 ± 0.3 | 2164 ± 104 | 31.4 ± 2.9 | 48 (96%) | 2.5 | 2005 | 26.8 |
| | P5 | 552 | 13.5 ± 0.3 | 10.2 ± 0.6 | 2054 ± 185 | 68.2 ± 11.0 | 120 (90%) | 6.7 | 1520 | 34.6 |
| AP$^F$-alt-E | P7 | 124 | 9.2 ± 1.2 | 5.8 ± 0.5 | 1806 ± 84 | 40.2 ± 4.5 | 5 (93%) | 4.4 | 1788 | 32.6 |
| | | 446 | 28.5 ± 2.8 | 16.6 ± 0.6 | 1454 ± 47 | 72.4 ± 6.5 | 120 (86%) | 11.9 | 1303 | 47.2 |
| AP$^{FF}$-alt-E | | 125 | 9.7 ± 0.2 | 7.4 ± 0.6 | 1778 ± 59 | 40.9 ± 2.5 | 5 (99%) | 6.1 | 1786 | 38.7 |
| | | 338 | 10.2 ± 0.1 | 11.7 ± 0.7 | 1385 ± 21 | 46.9 ± 3.4 | | | | |
| AP$^{Me}$-alt-E | P8 | 105 | 86.2 ± 16.1 | 13.0 ± 0.2 | 1236 ± 49 | 71.4 ± 2.7 | 120 (70%) | 7.2 | 864 | 31.0 |
| | | 420 | 139.6 ± 25.5 | 17.7 ± 0.3 | 1272 ± 52 | 84.8 ± 4.8 | 120 (87%) | 12.6 | 1117 | 49.7 |
| AP$^{tBu}$-alt-E | P9 | 150 | 648.3 ± 36.8 | 29.7 ± 3.1 | 34 ± 12 | 5.3 ± 1.9 | — | — | — | — |
| | | 424 | 467.9 ± 22.9 | 15.6 ± 0.8 | 565 ± 5 | 66.1 ± 2.2 | | | | |
| AP$^{Naph}$-alt-E | P10 | 115 | 1013.2 ± 82.1 | 51.8 ± 1.5 | 9 ± 1 | 2.5 ± 0.4 | — | — | — | — |
| | | 259 | 1221.6 ± 54.5 | 52.1 ± 0.3 | 7 ± 1 | 1.9 ± 0.3 | | | | |
| Ap$^{Hex}$-alt-E | P6 | 164 | 1.4 | <0.1 | >10000 | 0.68 | 5 min (100%) | <0.1 | >10000 | 0.59 |
| | | 464 | 4.3 | <0.1 | >10000 | 1.71 | 1 (100%) | <0.1 | >10000 | 1.71 |
| AP$^{Cl}$-alt-E | P11 | 424 | 218 ± 34 | 21.7 ± 0.9 | 954 ± 51 | 117 ± 8.6 | — | — | — | — |

[a]The self-healing efficiency was calculated based on the recovery rate of the elongation at break after recovery with respect to the elongation at break before use.

As one of the reasons why the copolymer produced in Example above exhibits elastomeric properties, self-healing ability, and shape-memory characteristics, conceivably construction of a network, in which the alternating unit of anisylpropylene and ethylene acts as a soft moiety, and the hard crystalline unit of ethylene-ethylene chains acts as a physical crosslinking point, is a key issue. In the case of the conventional self-healing materials, which utilize hydrogen bonds, ionic bonds, or the like, such interaction is weakened in water and may function only poorly (Non Patent Literature 2). However, in the E-AP (AP$^R$) copolymer in Examples above, the crystalline unit of ethylene-ethylene chains, and the alternating unit of anisylpropylene and ethylene are not affected by water. Therefore, there is a big advantage that it can exhibit the self-healing ability and shape-memory characteristics not only in the atmosphere, but also in water, or an acid, or alkaline aqueous solution. Two E-AP copolymers with a reduced "alternating property" respectively having an AP content of 25 mol % (P2'), and 12.5 mol % (P2") were synthesized. The healing efficiency of the copolymer P2' was significantly lower than that of P2, and P2" had completely lost its healing ability (it is however useful as a transparent film or the like for other applications, such as an intermediate layer film to be disposed between a polar film and a nonpolar film).

Figure 37:
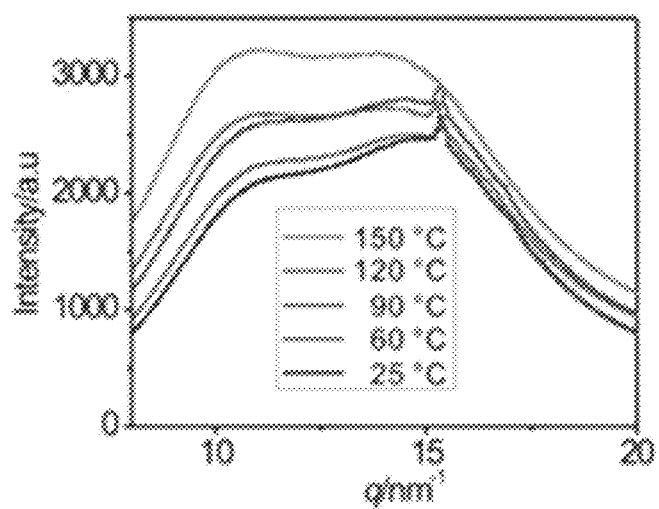
FIG. 37 shows the WAXD measurement results of a film of the polymer P5 produced in Example.

With respect to the film molded product of P5 (thickness 1 mm) prepared above, wide-angle X-ray diffraction (WAXD) analyses were performed under different temperature conditions (25° C., 60° C., 90° C., 120° C., and 150° C.). The results are shown in FIG. 37. As shown in FIG. 37, an X-ray diffraction peak attributed to the (110) plane of an orthorhombic crystal was observed at 15.26 nm⁻¹. This is considered to be derived from a crystalline nanodomain formed by aggregation of ethylene homo-polymerization sequences contained in the film. This diffraction peak was not observed under the condition of 150° C. This suggests that the crystalline nanodomain melted to lose the crystallinity.

Figure 38:
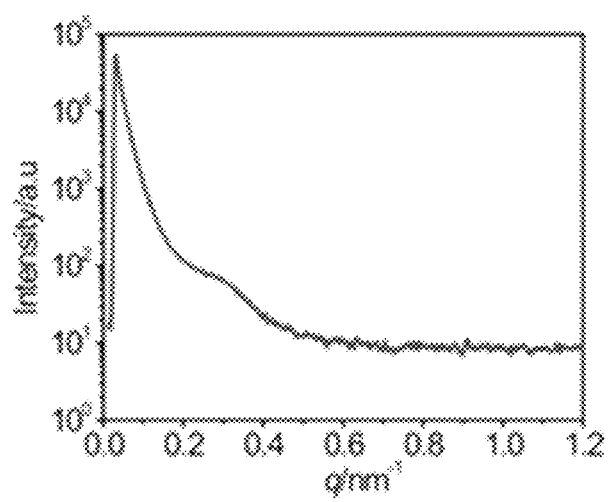
FIG. 38 shows the SAXS measurement result of a film of the polymer P5 produced in Example.

Also, with respect to the film molded product of P5 (thickness 1 mm), a small-angle X-ray scattering (SAXS) analysis was performed at room temperature (25° C.). The results are shown in FIG. 38. As shown in FIG. 38, a broad scattering peak having the peak top at about 0.283 nm⁻¹ was observed. This scattering peak is considered to be derived from the crystalline nanodomain. The average domain size was calculated according to the equation d=2π/q to find 22 nm.

The analyses of WAXD and SAXS were performed with the BL05XU beamline of a SPring-8 (Japan Synchrotron Radiation Research Institute, Hyogo, Japan). The X-ray wavelength was set at 0.1 nm. The 2D WAXD and 2D SAXS patterns were recorded using a PILATUS 1M (DECRIS, Switzerland) with 941×1043 pixels having a pixel size of 172×172 μm² as the X-ray detector. The distance from the sample to the detector was 106 mm for WAXD and 3906 mm for SAXS. The analysis was performed under precise temperature control using a sample chamber equipped with a block heater. The scattering vector is defined as q=(4π/λ)·sin θ (2θ is the scattering angle). The scattering vector was calibrated using the peak position of CeO$_2$ for WAXD, and collagen for SAXS. TGA was recorded with EXSTAR TG/DTA6200 Thermal Analyzer (Hitachi High-Tech Science Corporation, Tokyo, Japan). The rate of temperature increase was set at 10° C. min⁻¹.

An ultrathin film was formed by evaporating a solvent of a CH$_2$Cl$_2$ solution of P5 (0.5 mg/mL) on a 400-mesh carbon coated copper grid, and used as a TEM analysis sample. The TEM analysis was performed using a model JEM-2100F/SP of JEOL operated at an accelerating voltage of 200 kV. A phase separated structure was observed in which there were nanoscale crystalline domains dispersed in a continuous matrix (FIG. 36A).

The P5 film produced in the same manner as above was processed into a bag form. A string was passed near the opening of the bag to hang it, and water was poured up to half the height. A sewing needle was stuck from the bottom of the bag (bottom filled with water) upward (toward the opening), and after confirming that the needle had entered the water filling the bag, the needle was pulled out backward from the bag. This operation was carried out within about 3 sec. Although the needle was pulled out completely, the pinhole pierced by the needle at the bag bottom disappeared immediately by heeling, and leakage of water from the bag did not happen at all. From this it can be understood that the molded product of the present invention exhibits a self-healing ability even when it is used as a member to be placed at the interface between a liquid and a gas. From the above results, it can be understood that the molded product of the present invention can be utilized, for example, as a member for closing the wells of a microplate in which a plurality of wells are provided, and through the use of the molded product of the present invention, a sample (including a liquid sample) can be injected into, or taken out from the well inside even in a hermetically sealed state.

The P5 polymer was processed with a vacuum hot press and formed into a square platy shape with a length and a width of 2 cm and a thickness of 5 mm. This molded product sample was completely cut with a cutter at the position about 1 cm-long from the edge (midpoint) (into two pieces having the original thickness and length, and the width of half the length). When the cut surfaces of the two pieces were pressed together by hand at room temperature, they were jointed to one piece. The upper part and the lower part of this jointed sample were held with clips respectively. The upper clip was fixed to hang the sample such that the jointed surface is oriented approx. parallel to the floor. A 1.2 kg weight was hung on the lower clip and observed for about 1 min. The jointed molded product did not separate and maintained the integrity.

A solution of the P5 polymer dissolved in toluene is applied to a metal surface and dried to remove toluene. A film is formed on the metal surface. When a nick is formed in the surface of this film with a cutter, it will self-heal and close the nick to form a uniform film as in the case of a shaped film.

According to the present invention, it is possible to yield a molded product to which one or more functions such as high transparency, high elasticity, self-healing characteristics, and shape-memory characteristics has been imparted, by controlling the molecular weight of a polar olefin-based polymer to be used as a raw material, the monomer type, the polymerization ratio in the case of a copolymer, or the like. According to the present invention, it is possible to provide a molded product that is useful for various future application fields (such as a self-healable implant for a human body).

INDUSTRIAL APPLICABILITY

An olefin-based molded product of the present invention is applicable to, but not limited to, uses such as materials, surface coating materials, equipment, parts, and products for various industries (for example, medical care, construction, transportation, and electronic/electric industries). In particular, it is more favorably utilizable in the fields, where detection of a damage is very difficult, or repair needs high cost, or even not possible, for example, for equipment on the seabed, equipment or medical materials in outer space, instruments, etc.

The invention claimed is:

1. An olefin-based molded product comprising a copolymer comprising a structural unit of at least one polar olefin monomer (A) and a structural unit of at least one nonpolar olefin monomer (B), the copolymer comprises 30 mol % or more in the total sequences of the copolymer of alternating (A)-(B) sequence in which the structural units of (A) and (B) are aligned alternatingly, and -(B)-(B)- sequence which is the polymerization sequence of (B), where structural units of two or more kinds of nonpolar olefin monomers are included, a random copolymer, an alternating copolymer, a block copolymer, or another ordered copolymer constituted with structural units of two or more kinds of nonpolar olefin monomers is also included as the -(B)-(B)- sequence.

2. The olefin-based molded product according to claim 1, wherein the proportion of the alternating (A)-(B) sequence in the total sequences of the copolymer is 40 mol % or more, and wherein the proportion of the -(B)-(B)- sequence in the total sequences of the copolymer is 60 mol % or less.

3. The olefin-based molded product according to claim 1, the olefin-based molded product has crystalline nanodomain derived from the -(B)-(B)- sequence.

4. The olefin-based molded product according to claim 1, wherein the proportion of the polar olefin structural unit in the total structural units in the polymer is 20 mol % or more.

5. The olefin-based molded product according to claim 1, wherein the number average molecular weight of the polymer is $2.0 \times 10^3$ or more.

6. The olefin-based molded product according to claim 1, which is used as a self-healing material, or which is used as a shape-memory material.

7. The olefin-based molded product according to claim 1, wherein a self-healing rate of the olefin-based molded product is 80% or more within 5 days.

8. The olefin-based molded product according to claim 7, wherein a shape fixed rate and a shape recovery rate of the olefin-based molded product is 80% or more.

* * * * *